US008066382B2

(12) United States Patent
Silverstein et al.

(10) Patent No.: US 8,066,382 B2
(45) Date of Patent: Nov. 29, 2011

(54) STEREOSCOPIC PROJECTOR WITH ROTATING SEGMENTED DISK

(75) Inventors: Barry D. Silverstein, Rochester, NY (US); Joseph R. Bietry, Rochester, NY (US); Robert J. Metzger, Fairport, NY (US); James R. Kircher, Mendon, NY (US)

(73) Assignee: Eastman Kodak Company, Rochester, NY (US)

( * ) Notice: Subject to any disclaimer, the term of this patent is extended or adjusted under 35 U.S.C. 154(b) by 324 days.

(21) Appl. No.: 12/502,426

(22) Filed: Jul. 14, 2009

(65) Prior Publication Data
US 2011/0013144 A1    Jan. 20, 2011

(51) Int. Cl.
    G03B 21/28    (2006.01)
(52) U.S. Cl. .................. 353/20; 353/8; 353/98; 349/9
(58) Field of Classification Search .............. 353/7, 8, 353/20, 34, 98, 99; 349/9, 15; 359/464, 359/465, 471; 348/55, 58
See application file for complete search history.

(56) References Cited

U.S. PATENT DOCUMENTS

| | | | |
|---|---|---|---|
| 4,441,791 A | 4/1984 | Hornbeck | |
| 5,535,047 A | 7/1996 | Hornbeck | |
| 5,600,383 A | 2/1997 | Hornbeck | |
| 5,704,700 A | 1/1998 | Kappel et al. | |
| 5,719,695 A | 2/1998 | Heimbuch | |
| 5,798,819 A | 8/1998 | Hattori et al. | |
| 5,808,795 A | 9/1998 | Shimomura et al. | |
| 5,907,437 A | 5/1999 | Sprotbery et al. | |
| 5,914,818 A | 6/1999 | Tejada et al. | |
| 5,918,961 A | 7/1999 | Ueda | |
| 5,930,050 A | 7/1999 | Dewald | |
| 6,008,951 A | 12/1999 | Anderson | |
| 6,010,121 A | 1/2000 | Lee | |
| 6,062,694 A | 5/2000 | Oikawa et al. | |
| 6,089,717 A | 7/2000 | Iwai | |

(Continued)

FOREIGN PATENT DOCUMENTS

JP    2002323675    11/2002
(Continued)

OTHER PUBLICATIONS

"High Power Extended Vertical Cavity Surface Emitting Diode Lasers and Arrays and Their Applications", by Aram Mooradian et al., Micro-Optics Conference, Tokyo, Nov. 2, 2005.

(Continued)

*Primary Examiner* — William C Dowling
(74) *Attorney, Agent, or Firm* — Kevin E. Spaulding

(57) ABSTRACT

A stereoscopic digital image projecting system has a light source system providing polarized illumination having a first polarization state and a beam splitting system with a rotating segmented disk in the illumination, alternately generating first and second light beams, the rotating segmented disk having outer segments alternately transmissive and non-transmissive and inner segments radially aligned with the outer segments and alternately reflective and transmissive. A polarization rotator in a path of either the first or second light beam rotates the first polarization state to a second state orthogonal to the first. A combining system combines the first and second light beams into a combined light beam. A spatial light modulator modulates the combined light beam in a manner consistent with stereoscopic image data to form first and second modulated images having substantially orthogonal polarization states. Projection optics project the modulated images onto a display surface.

20 Claims, 31 Drawing Sheets

U.S. PATENT DOCUMENTS

| | | | |
|---|---|---|---|
| 6,240,116 B1 | 5/2001 | Lang et al. | |
| 6,445,487 B1 | 9/2002 | Roddy et al. | |
| 6,600,590 B2 | 7/2003 | Roddy et al. | |
| 6,625,381 B2 | 9/2003 | Roddy et al. | |
| 6,747,781 B2 | 6/2004 | Trisnadi | |
| 6,793,341 B2 | 9/2004 | Svardal et al. | |
| 6,950,454 B2 | 9/2005 | Kruschwitz et al. | |
| 6,975,294 B2 | 12/2005 | Manni et al. | |
| 6,986,580 B1* | 1/2006 | Huber | 353/20 |
| 7,052,145 B2 | 5/2006 | Glenn | |
| 7,116,017 B2 | 10/2006 | Ji et al. | |
| 7,244,028 B2 | 7/2007 | Govorkov et al. | |
| 7,296,987 B2 | 11/2007 | Rossi et al. | |
| 7,387,390 B2* | 6/2008 | Zhang | 353/31 |
| 7,891,816 B2* | 2/2011 | Silverstein et al. | 353/8 |
| 7,926,951 B2* | 4/2011 | Bietry et al. | 353/31 |
| 7,959,297 B2* | 6/2011 | Silverstein et al. | 353/31 |
| 2002/0114057 A1 | 8/2002 | Roddy et al. | |
| 2002/0196414 A1 | 12/2002 | Manni et al. | |
| 2006/0023173 A1 | 2/2006 | Mooradian et al. | |
| 2006/0291053 A1 | 12/2006 | Robinson et al. | |
| 2007/0127121 A1 | 6/2007 | Maximus et al. | |
| 2009/0096991 A1 | 4/2009 | Chien et al. | |
| 2009/0153752 A1 | 6/2009 | Silverstein | |
| 2009/0213330 A1* | 8/2009 | Silverstein et al. | 353/8 |
| 2009/0284713 A1* | 11/2009 | Silverstein et al. | 353/8 |
| 2010/0007852 A1* | 1/2010 | Bietry et al. | 353/8 |
| 2010/0026959 A1* | 2/2010 | Yoon et al. | 353/8 |
| 2010/0103519 A1* | 4/2010 | Silverstein et al. | 359/487 |
| 2010/0328429 A1* | 12/2010 | Silverstein et al. | 348/46 |
| 2010/0328609 A1* | 12/2010 | Silverstein et al. | 353/7 |
| 2010/0328610 A1* | 12/2010 | Silverstein et al. | 353/7 |
| 2010/0328611 A1* | 12/2010 | Silverstein et al. | 353/7 |
| 2011/0007279 A1* | 1/2011 | Silverstein et al. | 353/8 |

FOREIGN PATENT DOCUMENTS

| | | |
|---|---|---|
| JP | 2002344050 | 11/2002 |
| WO | 0231575 | 4/2002 |

OTHER PUBLICATIONS

"Speckle Phenomena in Optics: Theory and Applications", by Joseph W. Goodman (Roberts & Company Publishers, Greenwood Village, CO, 2007.

* cited by examiner

FOR 44a   ON ⎯⎯⎍⎯⎍⎯⎍⎯⎍⎯ (FIG. 7A)
          OFF

FOR 44b   ON
          OFF ⎯⎍⎯⎍⎯⎍⎯⎍⎯⎍⎯ (FIG. 7B)

*FIG. 8*

STEREOSCOPIC PROJECTOR WITH ROTATING SEGMENTED DISK

CROSS REFERENCE TO RELATED APPLICATIONS

The present invention is related to the commonly assigned U.S. Publication No. 2009/0122272, published May 14, 2009 entitled "Projection Apparatus Using Solid-State Light Source Array" filed by Silverstein et al., commonly assigned U.S. patent application Ser. No. 12/121,185 filed May 15, 2008 entitled "Uniform Speckle Reduced Laser Projection Using Spatial and Temporal Mixing" filed by Silverstein et al., commonly assigned U.S. patent application Ser. No. 12/488,661 filed Jun. 22, 2009 entitled "Optical Interference Reducing Element for Laser Projection," filed by Silverstein et al., and commonly assigned U.S. patent application Ser. No. 12/498,396, filed Jul. 7, 2009 entitled "Etendue Reduced Stereo Projection Using Segmented Disk" filed by Silverstein et al., each of which is incorporated herein by reference.

FIELD OF THE INVENTION

This invention relates to an apparatus for projecting a stereoscopic digital image and more particularly relates to an improved apparatus and method using polarized solid state lasers to create stereoscopic images for digital cinema projection.

BACKGROUND OF THE INVENTION

There is growing interest in high-quality projection systems that display three-dimensional (3D) or perceived stereoscopic content in order to offer consumers an enhanced visual experience in large venues. Although a number of entertainment companies have offered stereoscopic content in theaters, theme parks, and other venues, these companies have primarily employed film media for stereoscopic image presentation. To create the stereo image, two sets of films are loaded to two separate projection apparatus, one for each eye. Left- and right-eye images are then simultaneously projected using polarized light. One polarization is used for the image presented to the left eye; light of the orthogonal polarization is then used for the image presented to the right eye. Audience members wear corresponding orthogonally polarized glasses that block one polarized light image for each eye while transmitting the orthogonal polarized light image.

In the ongoing transition of the motion picture industry to digital imaging, some vendors, such as Imax, have continued to utilize a two-projection system to provide a high quality stereo image. More commonly, however, conventional projectors have been modified to enable 3D projection.

The most promising of these conventional projection solutions for multicolor digital cinema projection employ, as image forming devices, one of two basic types of spatial light modulators (SLMs). The first type of spatial light modulator is the Digital Light Processor (DLP) a digital micromirror device (DMD), developed by Texas Instruments, Inc., Dallas, Tex. DLPs have been successfully employed in digital projection systems. DLP devices are described in a number of patents, for example U.S. Pat. No. 4,441,791; U.S. Pat. No. 5,535,047; U.S. Pat. No. 5,600,383 (all to Hornbeck).

FIG. 1 shows a simplified block diagram of a projector apparatus 10 that uses DLP spatial light modulators. A light source 12 provides polychromatic unpolarized light into a prism assembly 14, such as a Philips prism, for example. Prism assembly 14 splits the polychromatic light into red, green, and blue component wavelength bands and directs each band to a corresponding spatial light modulator 20r, 20g or 20b. Prism assembly 14 then recombines the modulated light from each of the spatial light modulators 20r, 20g and 20b and provides this unpolarized light to a projection lens 29 for projection onto a display screen or other suitable surface.

DLP-based projectors demonstrate the capability to provide the necessary light throughput, contrast ratio, and color gamut for most projection applications from desktop to large cinema. However, there are inherent resolution limitations, with existing devices typically providing no more than 2148×1080 pixels. In addition, high component and system costs have limited the suitability of DLP designs for higher-quality digital cinema projection. Moreover, the cost, size, weight, and complexity of the Philips prism or other suitable combining prisms are significant constraints. In addition, the need for a relatively fast projection lens with a long working distance, due to brightness requirements, negatively impacts the acceptability and usability of these devices.

The second type of spatial light modulator used for digital projection is the LCD (Liquid Crystal Device). The LCD forms an image as an array of pixels by selectively modulating the polarization state of incident light for each corresponding pixel. LCDs appear to have some advantages as spatial light modulators for high-quality digital cinema projection systems. These advantages include relatively large device size, favorable device yields and the ability to fabricate higher resolution devices, for example 4096×2160 resolution devices available from Sony and JVC Corporations. Among examples of electronic projection apparatus that utilize LCD spatial light modulators are those disclosed in U.S. Pat. No. 5,808,795 (Shimomura et al.) and elsewhere. LCOS (Liquid Crystal On Silicon) devices are thought to be particularly promising for large-scale image projection. However, with LCD components it can be difficult to maintain the high quality demands of digital cinema, particularly with regard to color and contrast, since the high thermal load of high brightness projection affects polarization qualities of these devices.

Conventional methods for forming stereoscopic images from these conventional micro-display (DLP or LCOS) based projectors use either of two primary techniques to distinguish between the left and right eye content. One less common technique, utilized by Dolby Laboratories, for example, uses color space separation, as described in US Patent Application Publication No. 2007/0127121 by Maximus et. al. and elsewhere. Filters are utilized in the white light illumination system to momentarily block out portions of each of the primary colors for a portion of the frame time. For example, for the left eye, the lower wavelength spectrum of Red, Blue, and Green (RGB) is blocked for a period of time. This alternates with blocking the higher wavelength spectrum of Red, Blue, and Green (RGB) for the other eye. The appropriate color adjusted stereo content that is associated with each eye is then presented to each modulator for the eye. The viewer wears a corresponding filter set that similarly transmits only one of the two 3-color (RGB) spectral sets. The color separation approach enjoys some advantages over a polarization based projection approach. For example, images can be projected onto most screens without the requirement to use a more expensive polarization-maintaining screen. There are also disadvantages, however. The needed glasses are expensive. Viewing quality can be reduced by normal angular shift, head motion, and tilt. Additionally, adjustment of the color space can be difficult and there can be significant light loss due to filtering. Because of this, a higher lamp output may be needed or output image brightness reduced.

The second method for forming stereoscopic images uses polarized light. In the example embodiment of U.S. Pat. No. 6,793,341 to Svardal et al. and elsewhere, each of two orthogonal polarization states is delivered to a corresponding one of two separate spatial light modulators. Polarized light from both modulators is then projected simultaneously. The viewer wears polarized glasses with polarization transmission axes for left and right eyes orthogonally oriented with respect to each other. Although this arrangement offers efficient use of light, it can be an expensive configuration. This can be particularly true in projector designs that require a spatial light modulator for each color band.

Another approach, commercialized by Real-D, Beverly Hills, Calif., uses a conventional projector modified to modulate alternate polarization states that are rapidly switched from one to the other. This can be done, for example, where a DLP projector has a polarizer placed in the output path of the light, such as at a position 16 indicated by a dashed line in FIG. 1. The polarizer is required, since the DLP is not inherently designed to maintain the polarization of the input light, which is generally unpolarized, as the window of the device package depolarizes due to stress induced birefringence. An achromatic polarization switcher, similar to the type described in US application 2006/0291053 by Robinson et al. could be disposed at position 16 after the polarizer. A switcher of this type alternately rotates polarized light between two orthogonal polarization states, such as linear polarization states, to allow the presentation of two distinct images, one to each eye, while the user views the projected images with polarized glasses.

Real-D systems historically have utilized left and right circularly polarized light, where the glasses are made of a combination ¼ wave retarder plus a polarizer to change the circularly polarized light back to linearly polarized light before blocking one state. This arrangement appears to be less sensitive to head tilt and the achromatic polarization switcher is easier to fabricate. The glasses, however, add expense over embodiments that simply use a polarizer. In either case, the display screen must substantially maintain the polarization state of the incident image-bearing light and is, therefore, typically silvered. With such MEMS-based systems, there can be significant light loss, resulting from the requirement to use polarized light, which can reduce output light by half over conventional non-stereoscopic designs. There is additional cost due to the large polarization switcher as well as the alignment features and mounting to the front of the projections system. This system must be flexible in order to accommodate the variety of projectors that may be retrofitted. The polarization switcher design is also more complicated in that it must essentially handle the entire visible spectral band, retarding the light in equal amounts regardless of the wavelength. Failure to properly achieve this performance can generate unacceptable crosstalk, directing images to the wrong eye and reducing the quality of the stereoscopic effect. This type of crosstalk effect can even be physically disturbing to the viewer, in some cases. Thus, by comparison, LCOS-based projectors are advantaged in that the output is typically already polarized in most configurations.

A continuing problem with illumination efficiency relates to etendue or, similarly, to the Lagrange invariant. As is well known in the optical arts, etendue relates to the amount of light that can be handled by an optical system. Potentially, the larger the etendue, the brighter the image. Numerically, etendue is proportional to the product of two factors, namely the image area and the numerical aperture. In terms of the simplified optical system represented in FIG. 2 having light source 12, optics 18, and a spatial light modulator 20, etendue is a product of the light source area A1 and its output angle θ1 and, in a well-matched optical system, this is equal to the product of the modulator area A2 and its acceptance angle θ2. For increased brightness, it is desirable to provide as much light as possible from the area of light source 12. As a general principle, the optical design is advantaged when the etendue at the light source is most closely matched to the etendue at the modulator.

Increasing the numerical aperture, for example, increases etendue so that the optical system captures more light. Similarly, increasing the source image size, so that light originates over a larger area, increases etendue. In order to utilize an increased etendue on the illumination side, the etendue must be greater than or equal to that of the illumination source. Larger image sizes, however, typically result in a more costly system. This is especially true of devices such as LCOS and DLP components, where the silicon substrate and defect potential increase with size. As a general rule, increased etendue results in a more complex and costly optical design. Using a conventional approach such as that outlined in U.S. Pat. No. 5,907,437 (Sprotbery et al.) for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in such a conventional approach, optical components handle a sizable image area, therefore a high etendue, since red, green, and blue color paths are separate and must be optically converged. Moreover, although a configuration such as that disclosed in the '437 Sprotbery et al. disclosure handles light from three times the area of the final multicolor image formed, this configuration does not afford any benefit of increased brightness, since each color path contains only one-third of the total light level.

Efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

The goal of providing sufficient brightness for digital cinema applications at an acceptable system cost has eluded designers of both LCD and DLP systems. LCD-based systems have been compromised by the requirement for polarized light, reducing efficiency and increasing etendue, even where polarization recovery techniques are used. DLP device designs, not requiring polarized light, have proven to be somewhat more efficient, but still require expensive, short lived lamps and costly optical engines, making them too expensive to compete against conventional cinema projection equipment.

In order to compete with conventional high-end film-based projection systems and provide what has been termed electronic or digital cinema, digital projectors must be capable of achieving comparable cinema brightness levels to this earlier equipment. As some idea of scale, the typical theatre requires on the order of 10,000 lumens projected onto screen sizes on the order of 40 feet in diagonal. The range of screens requires anywhere from 5,000 lumens to upwards of 40,000 lumens. In addition to this demanding brightness requirement, these projectors must also deliver high resolution (2048×1080 pixels) and provide around 2000:1 contrast and a wide color gamut.

Some digital cinema projector designs have proved to be capable of this level of performance. However, high equipment cost and operational costs have been obstacles. Projection apparatus that meet these requirements typically cost in excess of $50,000 each and utilize high wattage Xenon arc lamps that need replacement at intervals between 500-2000 hours, with typical replacement cost often exceeding $1000. The large etendue of the Xenon lamp has considerable impact on cost and complexity, since it necessitates relatively fast optics to collect and project light from these sources.

One drawback common to both DLP and LCOS LCD spatial light modulators (SLM) has been their limited ability to use solid-state light sources, particularly laser sources. Although they are advantaged over other types of light sources with regard to relative spectral purity and potentially high brightness levels, solid-state light sources require different approaches in order to use these advantages effectively. Conventional methods and devices for conditioning, redirecting, and combining light from color sources, used with earlier digital projector designs, can constrain how well laser light sources are used.

Solid-state lasers promise improvements in etendue, longevity, and overall spectral and brightness stability but, until recently, have not been able to deliver visible light at sufficient levels and at costs acceptable for digital cinema. In a more recent development, laser arrays have been commercialized and show some promise as potential light sources. However, brightness itself is not yet high enough; the combined light from as many as nine individual arrays can be needed in order to provide the necessary brightness for each color.

Laser arrays of particular interest for projection applications include various types of VCSEL arrays, including VECSEL (Vertical Extended Cavity Surface-Emitting Laser) and NECSEL (Novalux Extended Cavity Surface-Emitting Laser) devices from Novalux, Sunnyvale, Calif. However, conventional solutions using these devices have been prone to a number of problems. One limitation relates to device yields. Due largely to heat and packaging problems for critical components, the commercialized VECSEL array is extended in length, but limited in height; typically, a VECSEL array has only two rows of emitting components. The use of more than two rows tends to increase yield difficulties dramatically. In addition, conventional VECSEL designs are prone to difficulties with power connection and heat sinking. These lasers are of high power; for example, a single row laser device, frequency doubled into a two row device by Novalux, produces over 3 W of usable light. Thus, there can be significant current requirements and heat load from the unused current. Lifetime and beam quality is highly dependent upon stable temperature maintenance.

Coupling of the laser sources to the projection system presents another difficulty that is not adequately addressed using conventional approaches. For example, using Novalux NESEL lasers, approximately nine 2 row by 24 laser arrays are required for each color in order to approximate the 10,000 lumen requirement of most theatres. It is desirable to separate these sources, as well as the electronic delivery and connection and the associated heat from the main thermally sensitive optical system to allow optimal performance of the projection engine. Other laser sources are possible, such as conventional edge emitting laser diodes. However, these are more difficult to package in array form and traditionally have a shorter lifetime at higher brightness levels.

As noted earlier, increased etendue results in a more complex and more costly optical design. In general, the best performance and lowest cost are obtained when the etendue is small and is well-matched between the illumination optics and the light modulator. Conventional stereoscopic projection systems using polarized light tend to double the etendue in order to project light of both polarization states over the same optical path. It would be beneficial to provide a stereoscopic projector that used polarized light to differentiate left-from right-eye images, but with reduced etendue over previous designs.

Thus, it can be seen that the challenge of providing a stereoscopic color projection system having cinema or near-cinema performance and brightness has not been met using conventional approaches. There is a need for a stereoscopic projector that provides reduced etendue and improved brightness with solid-state light sources.

SUMMARY OF THE INVENTION

It is an object of the present invention to address the need for stereoscopic imaging with a MEMS based digital spatial light modulators such as DLP and related microdisplay spatial light modulator devices. With this object in mind, the present invention provides a stereoscopic digital image projecting system comprising:

a light source system energizable to provide polarized illumination having a first polarization state;

a beam splitting system comprising a rotating segmented disk disposed in a path of the polarized illumination and alternately generating first and second light beams from the polarized illumination, the rotating segmented disk comprising outer segments alternately transmissive and non-transmissive and inner segments radially aligned with the outer segments and each alternately reflective and transmissive, wherein the inner reflective segments correspond with the outer transmissive segments;

a polarization rotator positioned in a path of either the first or second light beam and rotating the first polarization state to a second polarization state orthogonal or substantially orthogonal to the first polarization state;

a combining system combining the first and second light beams into a combined light beam;

a spatial light modulator modulating the combined light beam in a manner consistent with stereoscopic image data to form a first modulated image from illumination in the combined light beam having the first polarization state and to form a second modulated image from illumination in the combined light beam having the second polarization state; and projection optics configured to project the first and second modulated images onto a display surface.

It is a feature of the present invention that it provides ways for improved etendue matching between illumination and modulation components.

The present invention has the advantage that a single light source can be used to provide alternating polarization states, thereby eliminating the need to repeatedly cycle light sources on and off.

It has the additional advantage that it provides a convenient mechanism for balancing the light output in the two polarization states. Additionally, the present invention provides the advantage of a reduced transition time between the two polarization states.

It has the further advantage that an optical system with reduced etendue is provided for a stereoscopic projection apparatus that uses polarization states to differentiate left-from right-eye images.

Another advantage of the present invention is that it provides for lower thermal loading for critical system components.

Other advantages of embodiments of the present invention include reduced thermal loading, reduced ghosting, and improved brightness and contrast.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 8 is a timing diagram that shows the alternating timing of polarization states used for stereo image presentation;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation. Where used to describe components within various embodiments, the terms first, second, and so on do not denote any particular order or importance, but are more generally used to distinguish one element from another.

In the following disclosure, the phrase "left-eye image" denotes the image formed by a stereoscopic display apparatus and intended for viewing by the left eye of the viewer. Likewise, the phrase "right-eye image" refers to the image that is intended for viewing from the right eye of the viewer. Similarly, for a dual-viewer imaging apparatus, a "first viewer image" and "second viewer image" are separate images intended for first and second sets of viewers, respectively.

Embodiments of the present invention address the need for reduced etendue in a stereoscopic projection apparatus that uses polarization states to differentiate left- from right-eye images. Embodiments of the present invention take advantage of the inherent polarization of light that is emitted from a VECSEL laser array or other type of solid-state light array.

Other advantages of embodiments of the present invention include reduced thermal loading and improved brightness.

Figure 1:
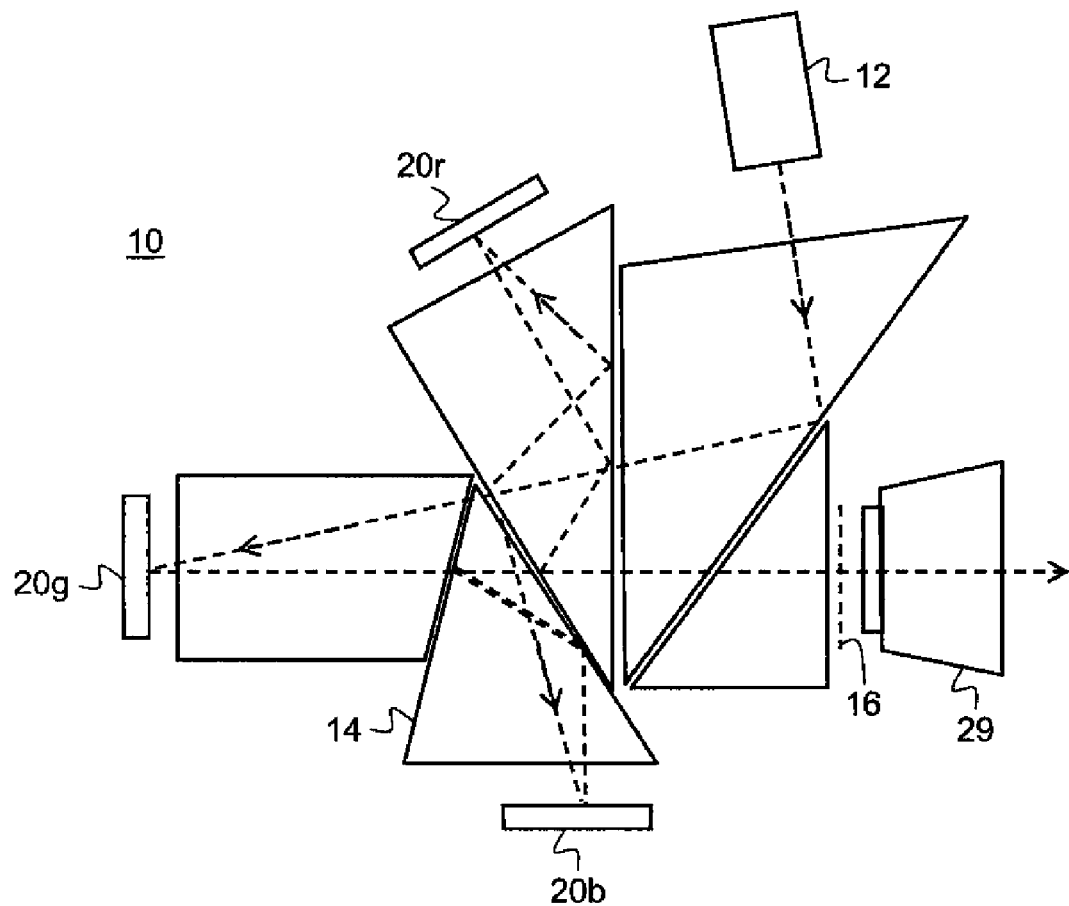
FIG. 1 is a schematic block diagram of a conventional projection apparatus using a combining prism for the different color light paths.
Figure 2:
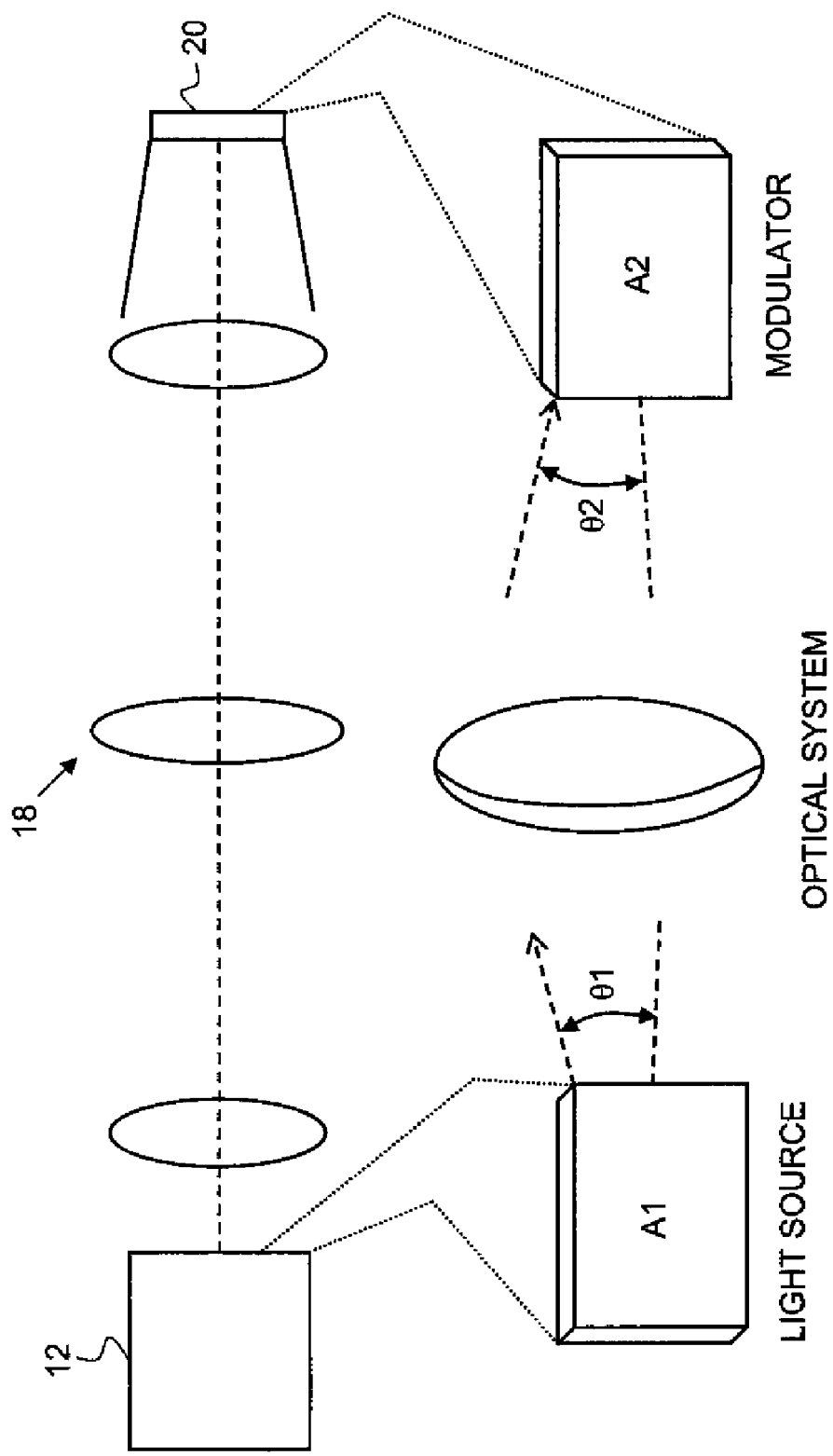
FIG. 2 is a representative diagram showing etendue for an optical system.
Figure 3A:
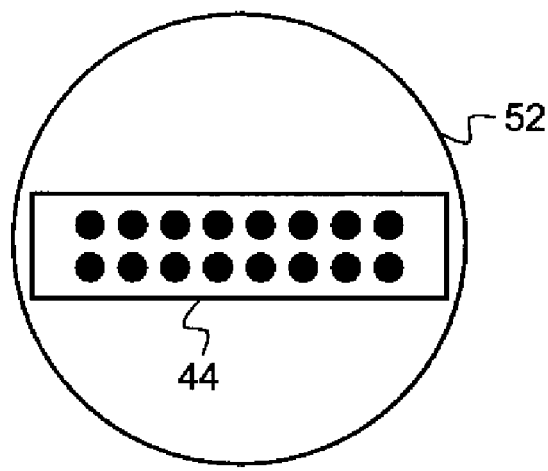
FIGS. 3A and 3B are plan views showing the relative fill factor of different solid-state light array and light combiner arrangements.
Figure 3B:
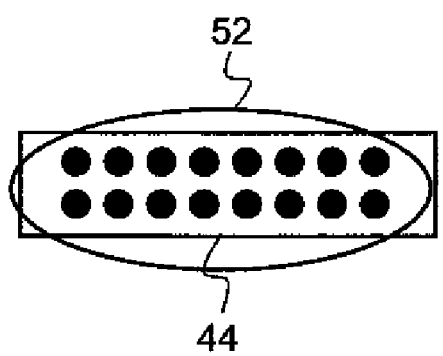

One approach used to reduce thermal loading by embodiments of the present invention is to isolate the light sources from light modulation components using a waveguide structure. Light from multiple solid-state light source arrays is coupled into polarization maintaining optical waveguides that deliver the light to the modulation device. When this is done, the geometry of the light source-to-waveguide interface can be optimized so that the waveguide output is well-matched to the aspect ratio of the spatial light modulator. In practice, this means that the waveguide aperture is substantially filled or slightly under-filled for maintaining optimal etendue levels. This arrangement also helps to minimize the speed requirement of illumination optics. Referring to FIGS. 3A and 3B, the input aperture of a light guide 52 is shown in cross section. A solid-state light array 44 is shown as it would appear at the input aperture of light guide 52, if properly scaled. As shown in FIG. 3A, the aperture is underfilled, which may easily cause a poor etendue match at the spatial light modulator end of light guide 52. In FIG. 3B, the aspect ratios of array 44 and light guide 52 are well matched by reshaping the input aperture of light guide 52 from its conventional circular form. In yet other arrangements not shown in FIG. 3A or 3B, multiple arrays 44 can be combined in order to effectively form a larger array. Methods of combining multiple arrays 44 are described in more detail subsequently.

In embodiments using this approach, an optical fiber can be utilized for light guide 52. In one embodiment, a rectangular core optical fiber is used. For example, rectangular core fiber from Liekki of Lohaja, Finland has been fabricated to better match source aspect ratios.

Figure 4:
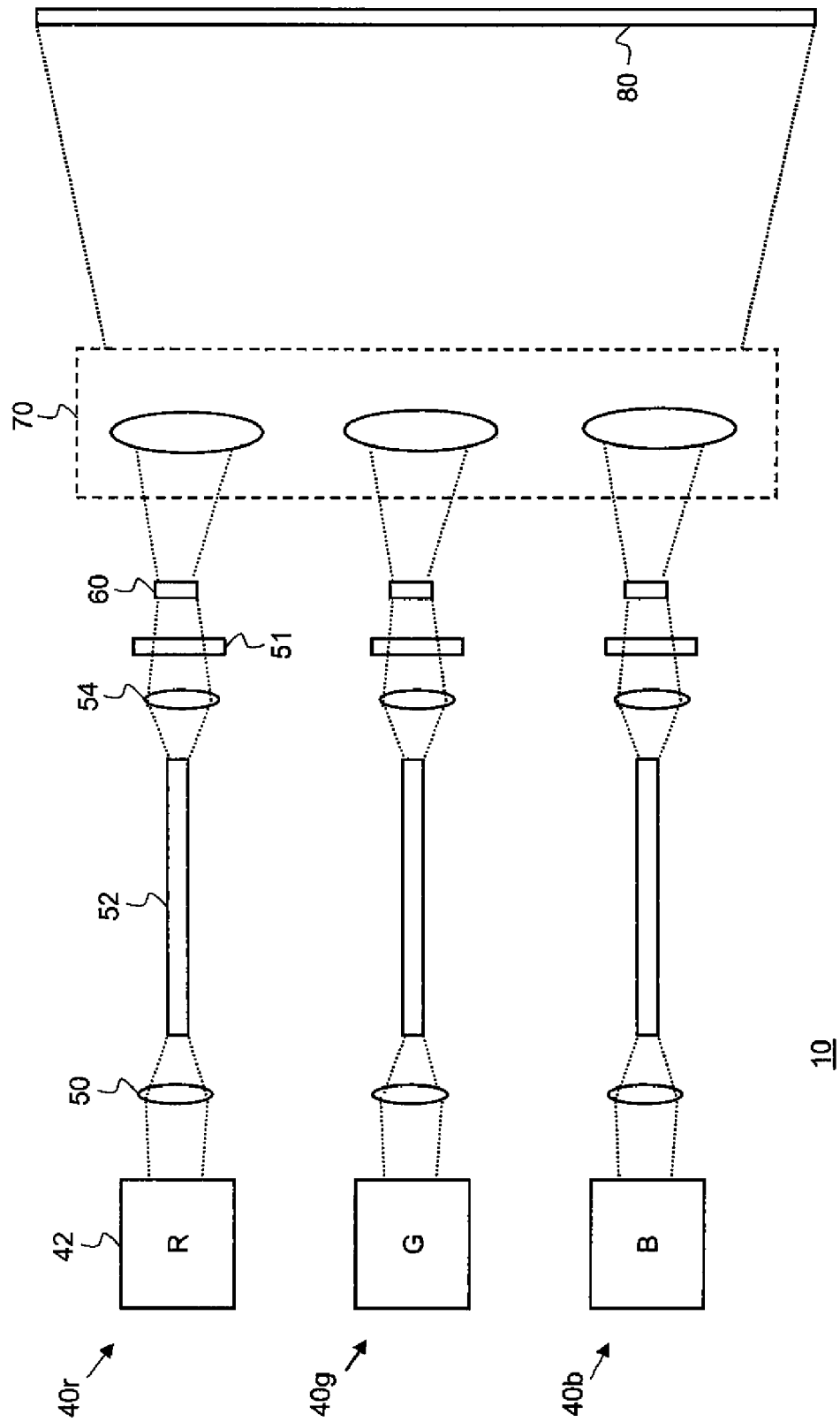
FIG. 4 is a schematic block diagram showing the general arrangement of a projection apparatus using an illumination combiner for stereo image projection.

In order to better understand the present invention, it is instructive to describe the overall context within which apparatus and methods of the present invention can be operable. The schematic diagram of FIG. 4 shows a basic arrangement for projection apparatus 10 that is used in a number of embodiments of the present invention. Three light modulation assemblies 40r, 40g and 40b are shown, each modulating one of the primary Red, Green, or Blue (RGB) colors from an illumination combiner 42. In each light modulation assembly 40r, 40g and 40b, an optional lens 50 may direct light into an optional polarization maintaining light guide 52. At the output of light guide 52, or otherwise receiving light from lens 50, a lens 54 then directs light through an integrator 51, such as a fly's eye integrator or integrating bar, for example. This light goes to a spatial light modulator 60. Spatial light modulator 60 is a micro-electromechanical systems (MEMS) device, such as a DLP or other type of reflective MEMS component, including any of the types of MEMS modulator components that modulate light by reflection or by diffraction. These devices can be considered as "polarization state neutral", since they do not modulate light at each pixel by modulating the polarization state of the pixel; any change to the polarization state of the incident light for any pixel is inadvertent, a function of its incident angle when reflected from the MEMS surfaces for that pixel. The incident angle of light to the MEMS spatial light modulator can be adjusted to minimize any unwanted polarization effects, as described subsequently. For embodiments of the present invention, the modulator must take light of two orthogonal input polarization states and output light of two orthogonal polarization states that correspond to the respective input states. The output polarization states may, however, be rotated with respect to the input states.

Projection optics 70, indicated generally in a dashed outline in FIG. 4 due to its many possible embodiments, then direct the modulated images to a display surface 80. The overall arrangement shown in FIG. 4 is then used for subsequent embodiments of the present invention, with various arrangements used for illumination combiner 42. In some embodiments, illumination from any of light modulation assemblies 40r, 40g and 40b may be directed to an integrator 51 without the use of light guide 52. Light modulation assemblies 40r, 40g and 40b then deliver polarized light to a polarization state neutral spatial light modulator 60 and subsequently to projection lens 70.

Figure 5:
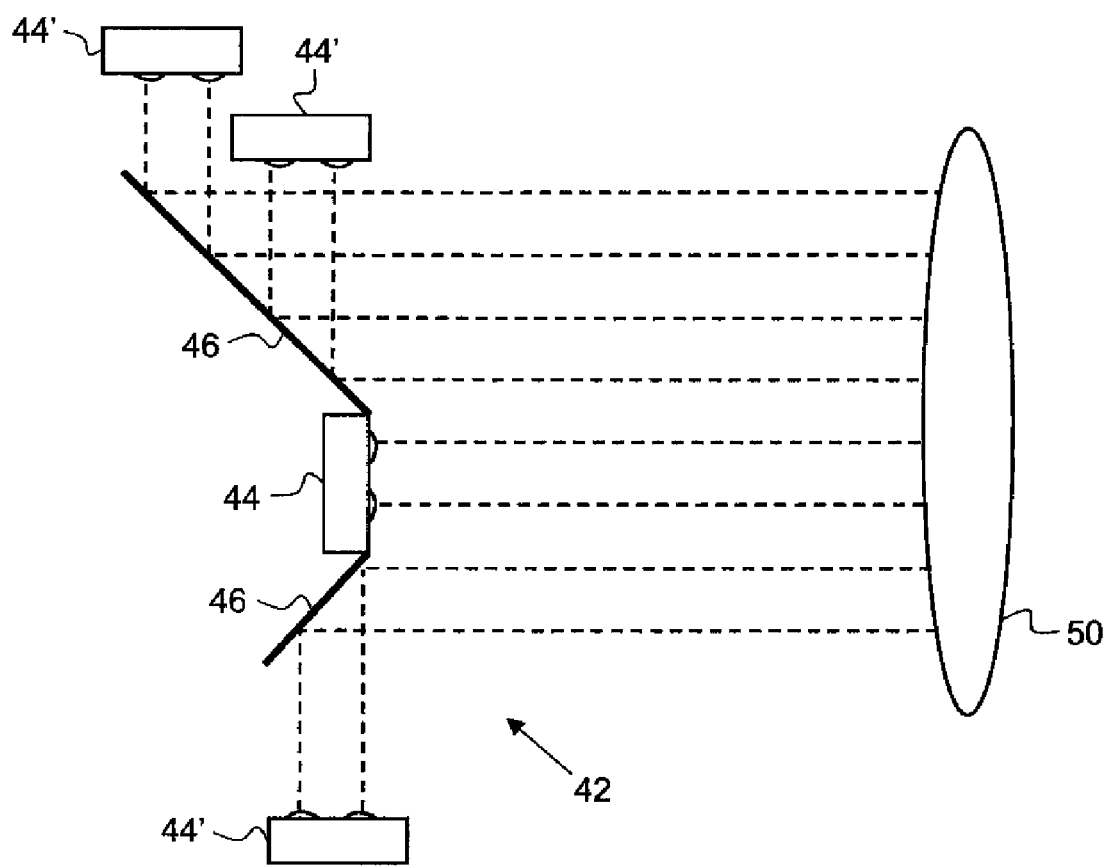
FIG. 5 is a schematic side-view diagram showing how polarized light from multiple solid-state light arrays can be provided along the same illumination path.
Figure 6:
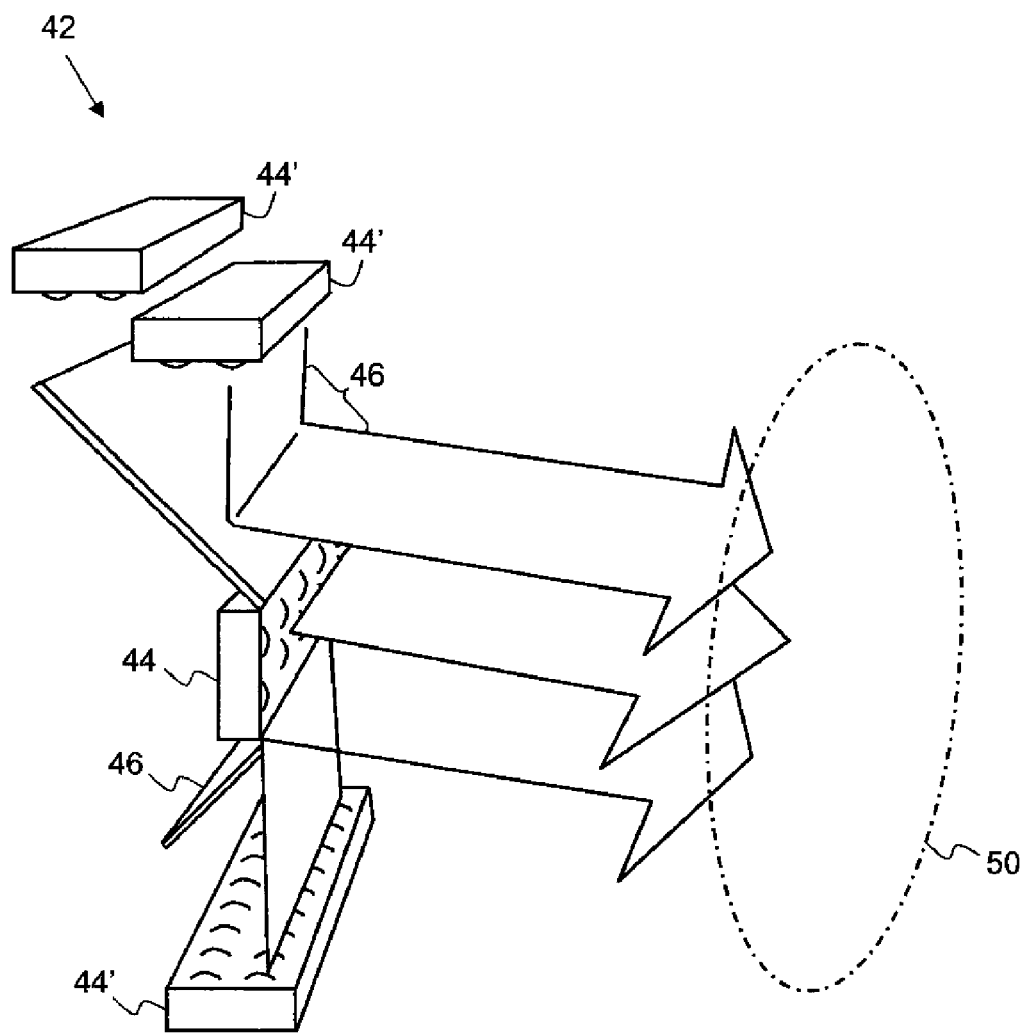
FIG. 6 is a perspective of the light combining arrangement of FIG. 5.

FIG. 5 shows one approach for combining multiple solid state light arrays 44 and 44' to form a larger array. FIG. 6 shows a perspective of the configuration of FIG. 5. In FIGS. 5 and 6, one or more interspersed mirrors 46 are used to place the optical axis of additional arrays 44' in line with array 44 to provide a combined light array, which is directed to optional lens 50. However, it can be appreciated that heat and spacing requirements may limit how many arrays 44 can be stacked in this manner.

Figure 7A:
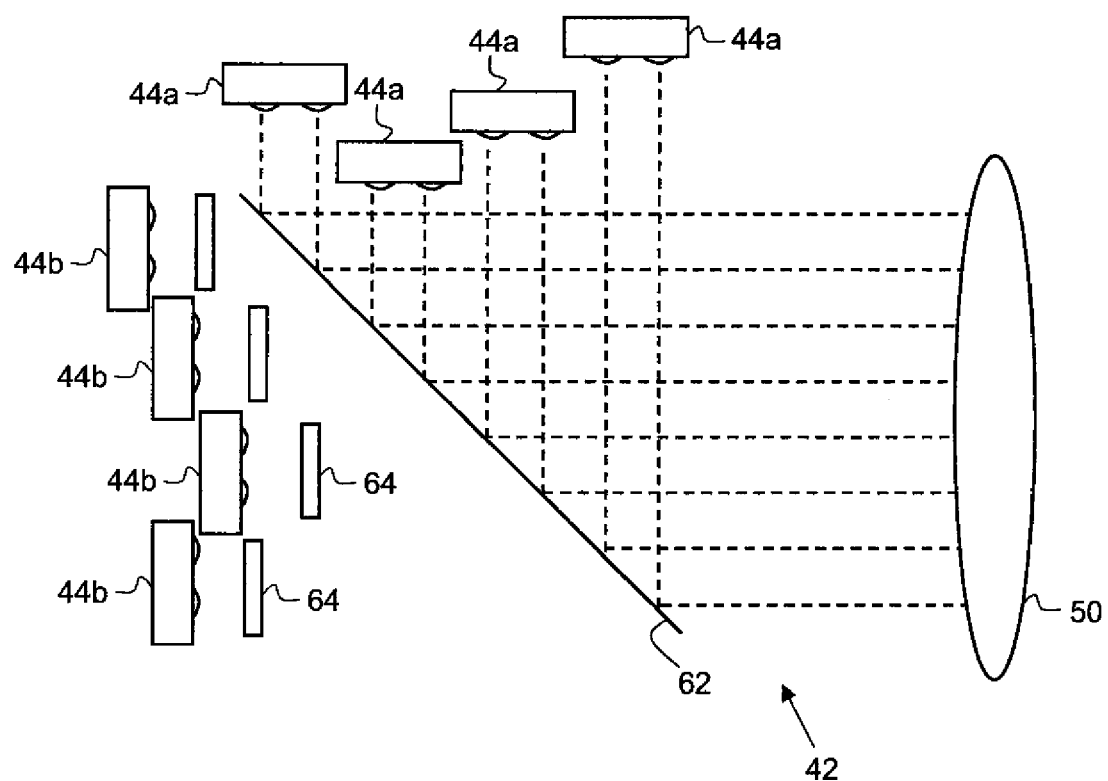
FIG. 7A is a schematic side-view diagram showing the use of a polarization beam-splitter for directing illumination of one polarization state from multiple solid-state light arrays in one embodiment.
Figure 7B:
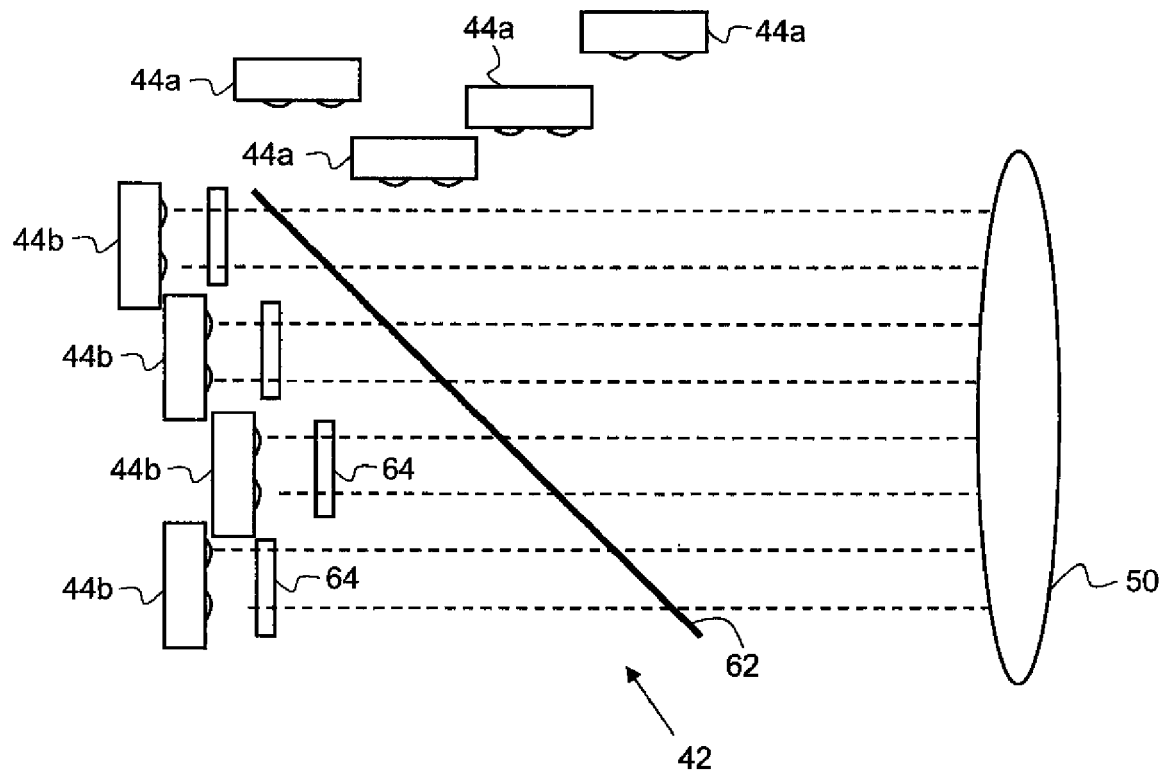
FIG. 7B is a schematic side-view diagram showing the use of a polarization beam-splitter for directing illumination of orthogonal polarization states from multiple solid-state light arrays in one embodiment.
Figure 8:
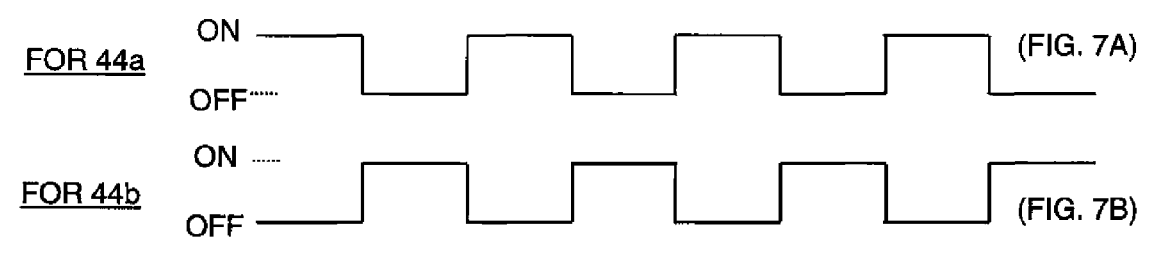

The arrangements shown in FIGS. 5 and 6 can be modified somewhat to allow the use of polarized light having different polarization states, as shown in FIGS. 7A and 7B and in the timing chart of FIG. 8. The timing diagram of FIG. 8 shows, within any one of light modulation assemblies 40r, 40g, and 40b, how light that is directed to the same spatial light modulator 60 (FIG. 4) can be rapidly alternated between two orthogonal polarization states to provide left- and right-eye images accordingly using two banks of polarized lasers. For this example, solid state laser arrays 44a and 44b are used. Polarized solid state laser arrays 44a and 44b provide light of orthogonal polarization states, such as using half wave plates 64 for one of these banks of arrays, as shown in FIGS. 7A and 7B. In one half of the alternating illumination cycle, solid state laser arrays 44a are energized, as shown in FIG. 7A. This polarized light reflects from a polarization beam-splitter 62. In the other half of the alternating illumination cycle, solid state laser arrays 44b are energized, as shown in FIG. 7B. The polarization of this light is rotated so that it is transmitted through polarization beam-splitter 62. The polarized light beams are then directed to optional lens 50. For non-stereoscopic applications, the light from both polarized lasers 44a and 44b may be used together to provide a brighter image, or used at half power to balance the lifetime each laser source.

This arrangement advantageously puts light of either polarization onto the same illumination axis. The etendue using this approach remains the same as shown in the configuration shown earlier for a single channel in FIG. 5. Therefore in non-stereoscopic applications, where both polarization states are imaged, the brightness of the source effectively doubles. However, in the case where stereo display is desired, only a single source is utilized at one particular moment in time, so that the effective brightness remains the same as in FIG. 5. While this arrangement is preferred for its simplicity and provides alternating orthogonal polarization states to the spatial light modulator 60, it requires that the lasers operate consistently over the frequency range needed, in order to have each orthogonal combined laser array turn on and off. For digital cinema applications, this is currently at either 120 hz or 144 hz depending on the setup. Many lasers, however, may exhibit thermal stabilization difficulties, thereby causing unstable power fluctuations in this frequency domain. Therefore, in some cases it is required to alternate the orthogonal state of the light indirectly (that is, not through source modulation), either at the modulator, or subsequently following modulation.

Figure 9A:
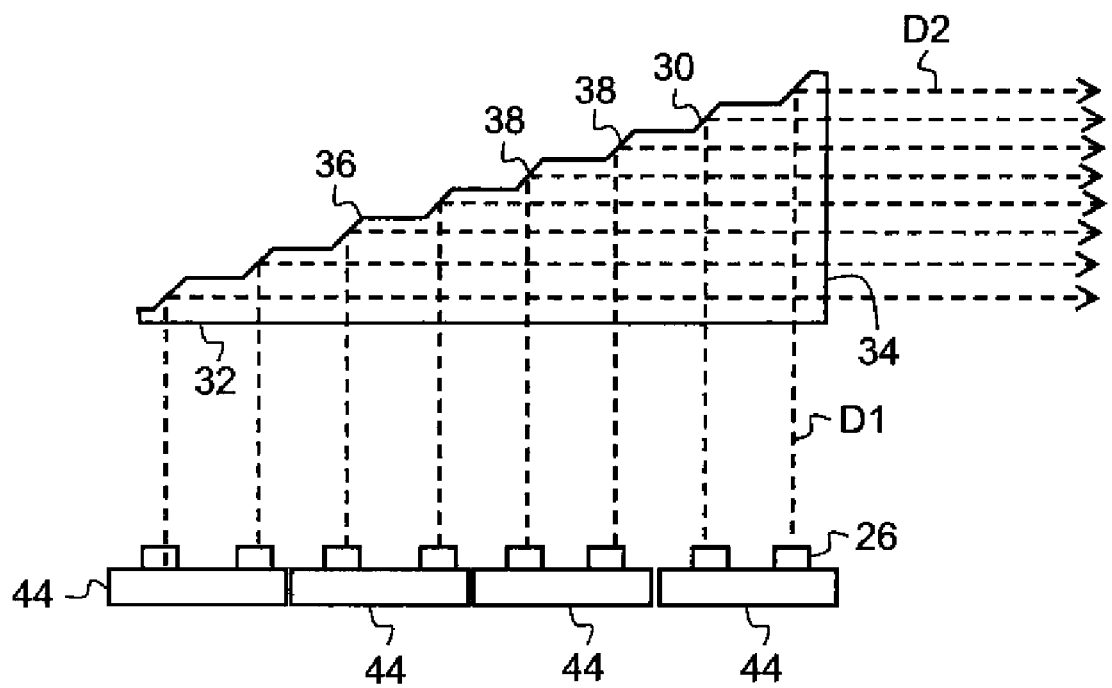
FIG. 9A is a schematic side-view diagram showing the use of a light-redirecting prism for combining illumination from multiple solid-state light arrays in one embodiment.
Figure 9B:
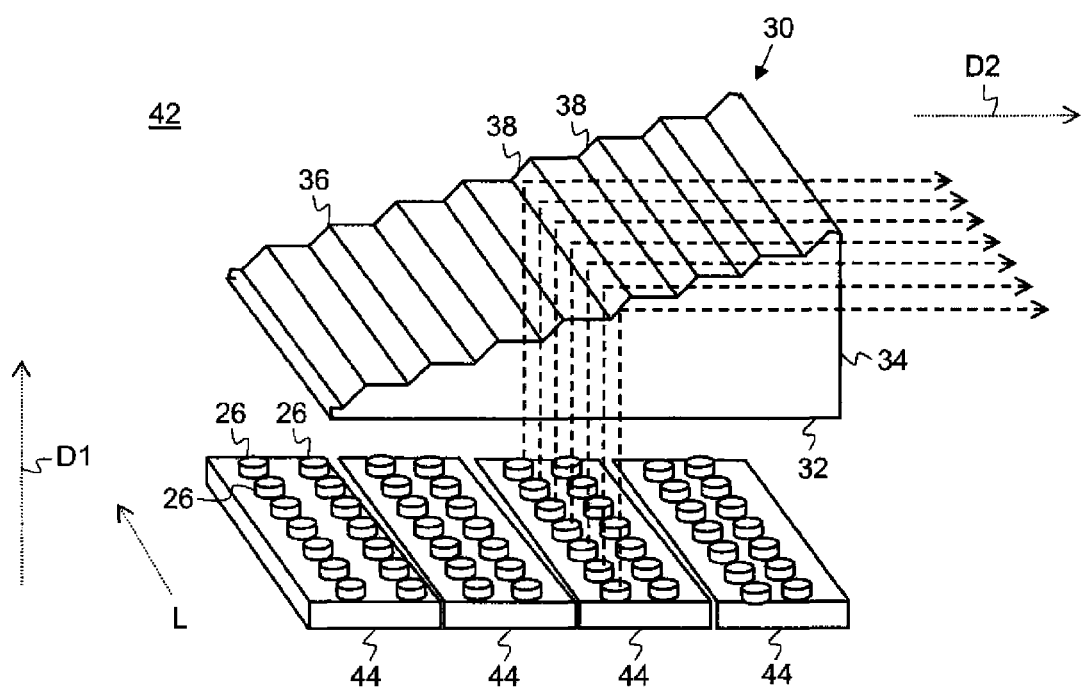
FIG. 9B is a perspective of the light-redirecting prism of FIG. 9A.

FIGS. 9A and 9B show side and orthogonal views, respectively, of an embodiment of illumination combiner 42 that combines laser light from four solid-state light arrays 44, concentrated within a smaller area. As FIG. 9B shows, solid state light arrays 44 have multiple lasers 26 that extend in a length direction L. A light-redirecting prism 30 has an incident face 32 that accepts light emitted from solid state light arrays 44 in an emission direction D1. Light is redirected through an output face 34 to an output direction D2 that is substantially orthogonal to emission direction D1. Light redirecting prism 30 has a redirection surface 36 that has light-redirecting facets 38. Light-redirecting facets 38 and other facets on redirection surface 36 extend in length direction L. Light-redirecting facets 38 are at an oblique angle relative to emission direction D1 and provide Total Internal Reflection (TIR) to light emitted from lasers 26. When arranged as shown in FIGS. 9A and 9B, these features help to narrow the light path for this illumination, providing a narrower light beam.

Figure 10:
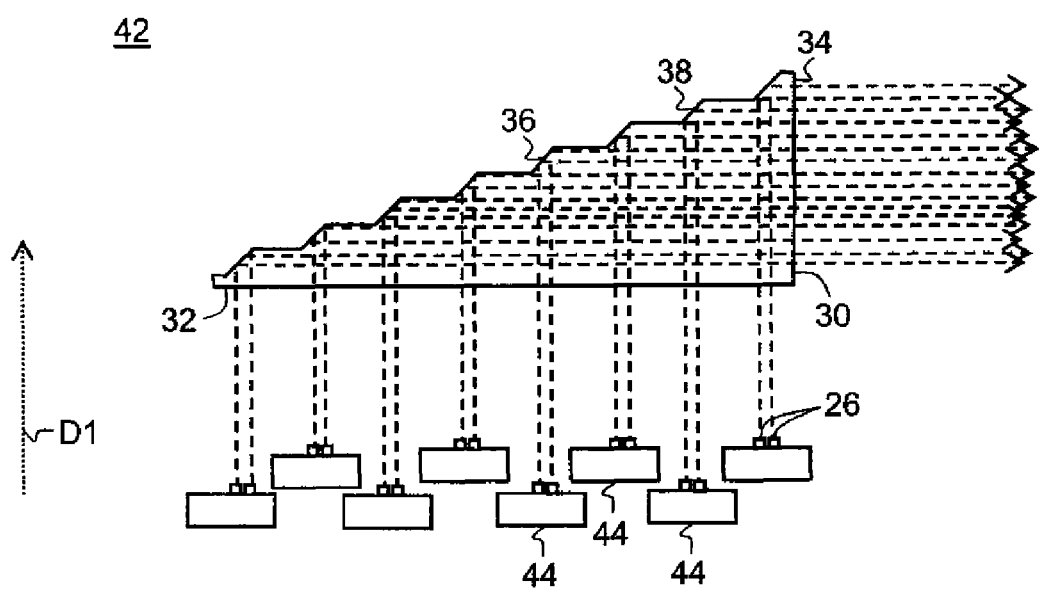
FIG. 10 is a schematic side view of a light-redirecting prism in an alternate embodiment.

A number of variations are possible. For example, the cross-sectional side view of FIG. 10 shows an alternate embodiment in which light-directing facets 38 of light redirecting prism 30 are scaled to redirect light from multiple rows of lasers 26 at a time. Incident face 32 may not be normal with respect to emission direction D1, allowing some offset to the arrangement of light arrays 44 and requiring that the index of refraction n of light redirecting prism 30 be taken into account.

Figure 11:
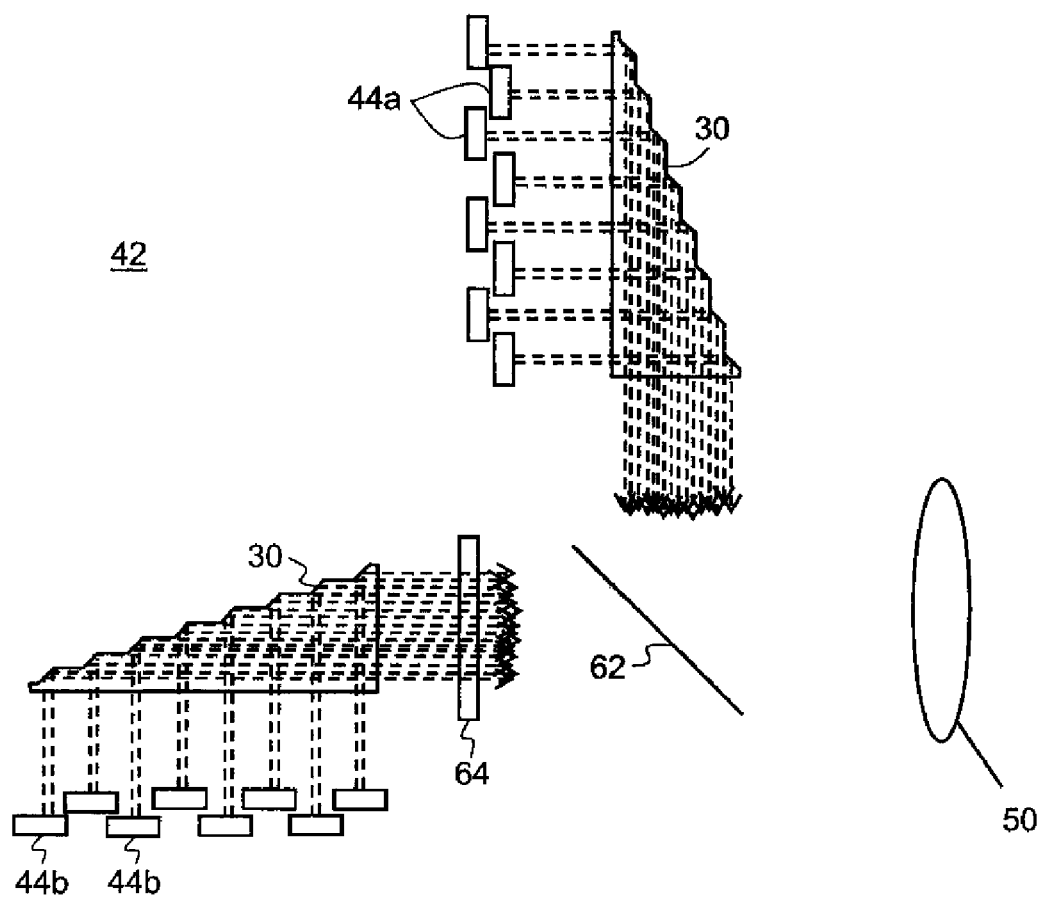
FIG. 11 is a schematic side view showing the use of two light-redirecting prisms, each providing light from solid-state light arrays, each having different polarization.

The schematic block diagram of FIG. 11 shows how multiple light redirecting prisms 30 can be utilized to provide increased brightness in an embodiment of an illumination combiner 42 that uses alternating polarization states. As was described earlier with reference to FIGS. 7A and 7B, alternating illumination from light arrays 44a and 44b, in combination with half wave plate 64 and polarization beam-splitter 62, directs light of orthogonal polarization states toward optional lens 50, and onto spatial light modulator 60 (FIG. 4) for providing a stereoscopic image.

Figure 12:
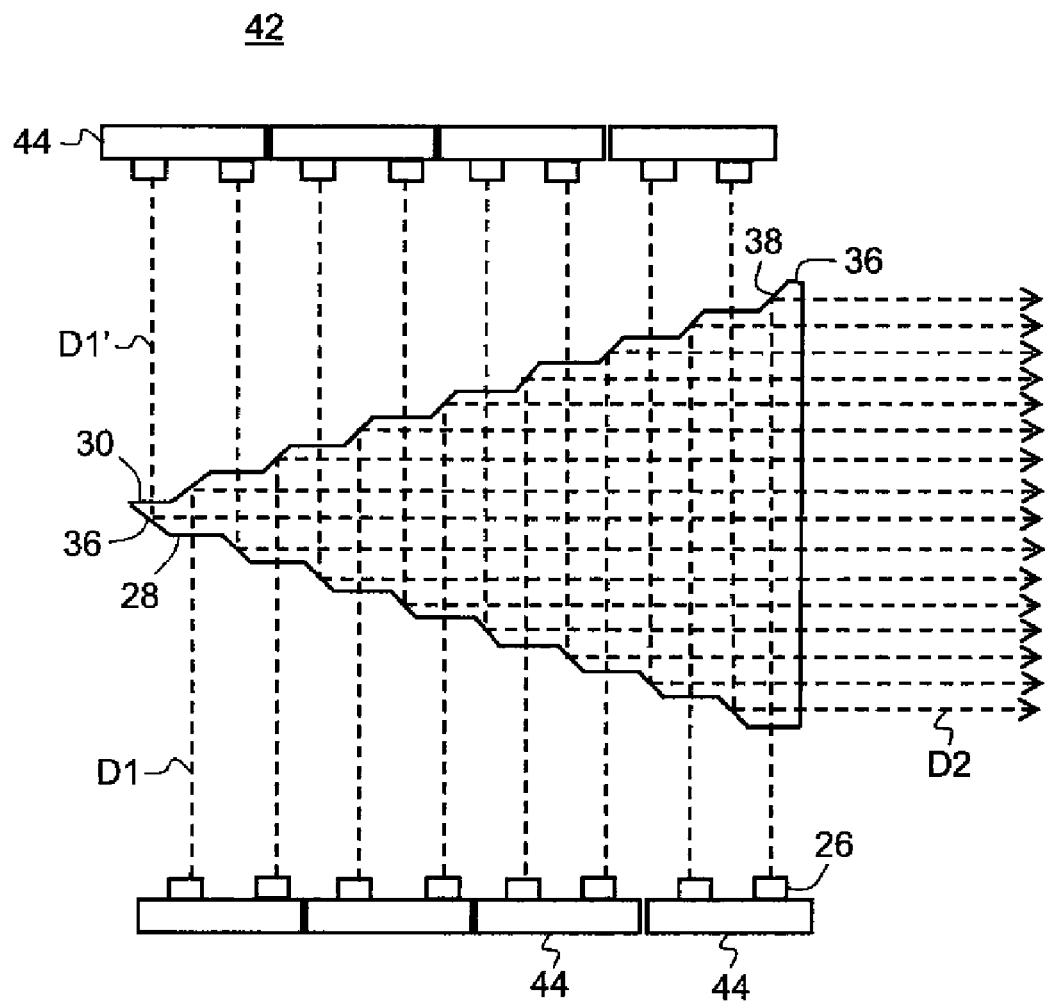
FIG. 12 is a schematic side view showing the use of an embodiment of a light-redirecting prism that accepts light from both sides.

The cross-sectional side view of FIG. 12 shows another embodiment of light-redirecting prism 30 in illumination combiner 42 that provides an even more compact arrangement of illumination than the embodiment shown in FIGS. 9A-10 for using solid-state light arrays. In this embodiment, light redirecting prism 30 has two redirection surfaces 36, accepting light from solid state light arrays 44 that are facing each other, with opposing emission directions D1 and D1'. Each solid state light array 44 is comprised of lasers 26. Each redirection surface 36 has two types of facets: a light-redirecting facet 38 and an incidence facet 28 that is normal to the incident light from the corresponding solid state light array 44. The light-redirecting facets 38 redirect the light beams into output direction D2.

The configuration of FIG. 12 allows for easier alignment of the various laser modules to the light-redirecting prism 30 by retro-reflection of a small residual light from an anti-reflection coated face back into each of the lasers. This retro-reflection can be useful as a means of creating a subtle external cavity that may induce mode instability in a laser. While such mode hopping may be considered noise under typical applications, this noise can add value in projection by further reducing the laser coherence (and inter-laser coherence) thereby reducing visual speckle at the image plane. Additionally, with this dual sided approach, laser modules are interleaved with light from differing modules neighboring each other, providing a source of further spatial mixing when the light is optically integrated further in the optical system. This again helps to reduce possible speckle and increase system uniformity.

Figure 13:
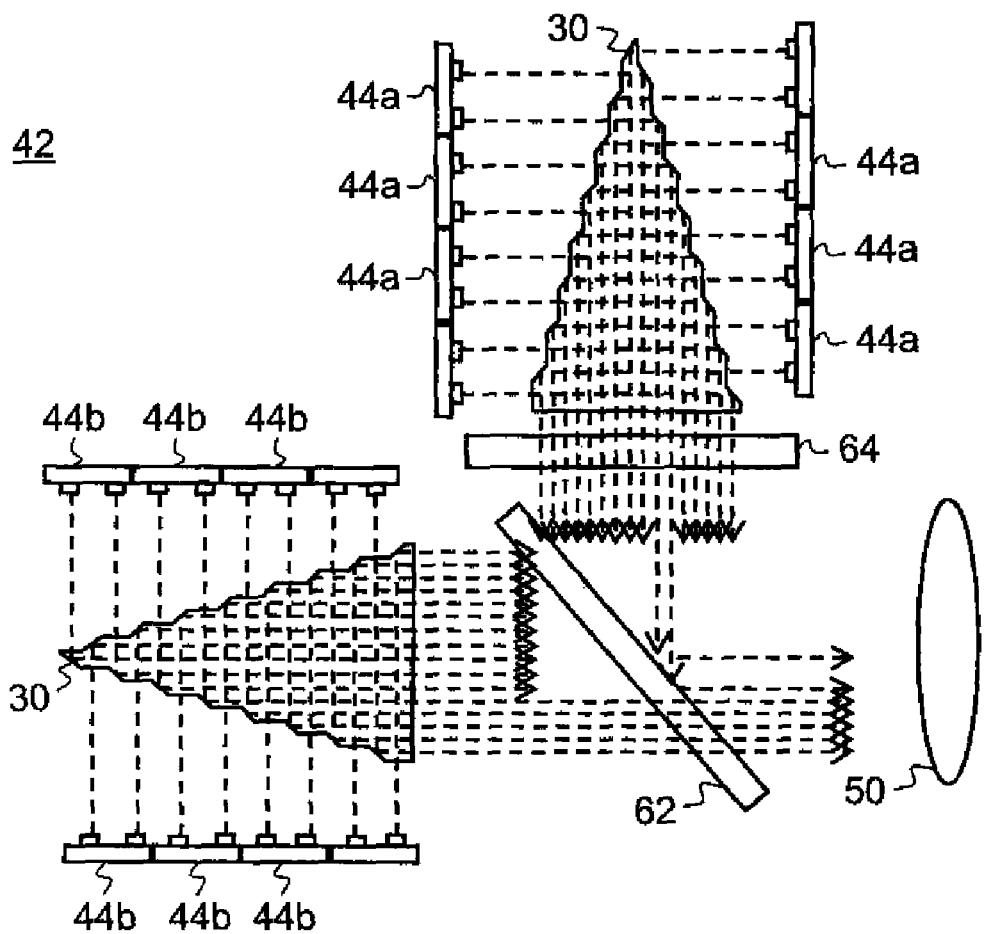
FIG. 13 is a schematic side view of an illumination apparatus using a light-redirecting prism of FIG. 12 for light of each polarization.

FIG. 13 shows how a pair of prisms 30 of the type shown in FIG. 12 can be used to direct light of orthogonal polarization states from two sets of solid state laser arrays 44a and 44b toward lens 50 using half wave plate 64 and polarization beam-splitter 62.

While it can be seen that the orientation of the prism 30 to solid state light arrays 44 in FIG. 12 is convenient for many applications, normal incidence of the light beams with respect to the input or output faces is not required for combining the illumination sources. It is generally advantageous, however, that the redirected light beams exiting the prism 30 at output face 34 be substantially parallel to each other. Achieving this requires careful consideration of a number of factors. These factors include the combination of the angle of incidence of the solid state light arrays 44 on each side (as they may be different) to incidence facets 28 on each side and the refraction in the light redirecting prism 30 based on the index of refraction of the material. In addition, the reflection off of the light-redirecting facets 38 from each side (again, these may be different on each side) must be considered and its combination with the refraction of the light redirecting prism 30 must cooperate so that output light beams from the output face 34 are in parallel.

Figure 14:
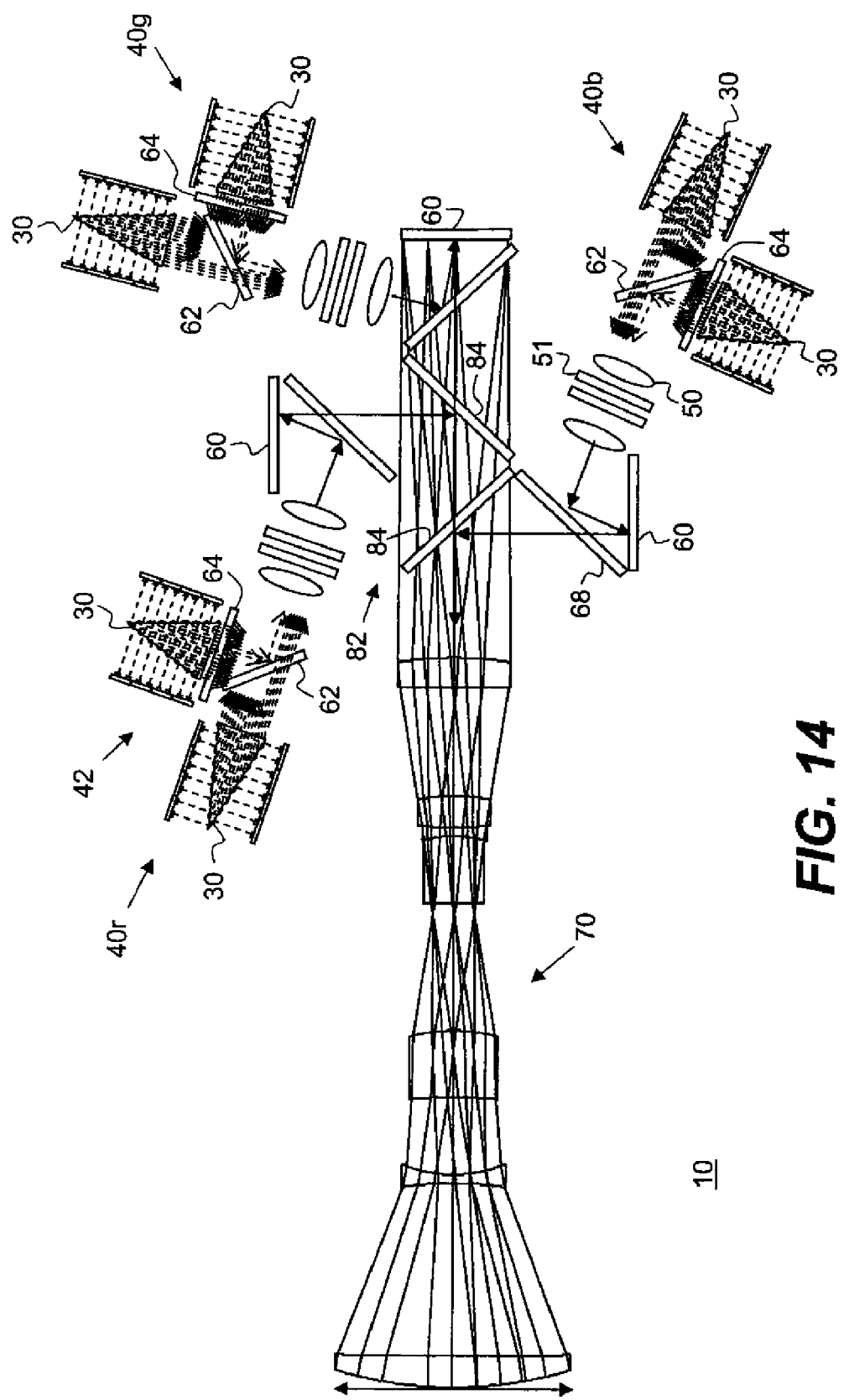
FIG. 14 is a schematic diagram of an alternate projection apparatus using polarized illumination with the light-redirecting prisms of FIG. 12, without light guides.

The schematic block diagram of FIG. 14 shows an embodiment of projector apparatus 10 that uses illumination combiners 42 with light-redirecting prisms 30 for three independent red, green and blue color channels. Each light modulation assembly 40r, 40g, and 40b has a pair of light redirecting prisms 30 with a similar arrangement of polarization-directing components as that described for FIG. 13. In each light modulation assembly, polarized light from one or the other light redirecting prism 30 is directed through polarization beam-splitter 62 to lens 50 and integrator 51 onto spatial light modulator 60 to form a modulated image. Spatial light modulator 60 is a digital micromirror or other MEMS device modulates light maintaining two orthogonal orientations of output light related to the orthogonal orientations of the input light. In the embodiment shown, designed to use the angular modulation of a micromirror device, thin film coated dichroic surface 68 is treated to reflect or transmit incident light according to its incident angle, so that modulated light is directed to a dichroic combiner 82. Dichroic combiner 82 has an arrangement of dichroic surfaces 84 that selectively reflect or transmit light according to wavelength, combining the modulated light from each light modulation assembly 40r, 40g, and 40b onto a single optical path through projection optics 70. While light guides can be utilized between the lasers and the modulator, this embodiment can be advantaged because such light guides can degrade polarization of the transmitted light. For such an embodiment lenslet arrays would offer advantages for uniformizing the illumination, since polarization states are maintained. However, this type of embodiment does not enjoy the advantages provided by a light guide (not shown), such as improved heat separation between the lasers illumination section and the modulator projection optics section. In either embodiment, the laser light may be used in the near field condition or in the far field condition, where premixing of the light is provided to reduce possible speckle and to further improve the uniformity of the light provided to the integrator 51. Laser speckle is further reduced by the use of an arrangement of independent lasers combined to form a single illumination source, as well as the use of uniformizing optics like lenslet arrays.

The present invention allows a number of variations from the exemplary embodiments described herein. For example, a variety of polarized laser light sources can be used as alternatives to VECSEL and other laser arrays. Light directing prism 30 can be made from many highly transmissive materials. For low power applications, plastics may be chosen. For higher power application, glass may be more appropriate.

One of the significant advantages of using lasers is their small etendue, enabling higher efficiency simpler optical systems. Unfortunately, as just discussed, small etendue also means relatively high energy densities on components when used in digital cinema based systems. In systems where the lasers cannot be directly modulated to create alternating orthogonal polarizations, it is necessary to rotate the polarization state or block one of the orthogonal polarization states by alternative means. One method of doing this is to utilize electronic polarization rotators or shutter, such as liquid crystal retarders or liquid crystal shutters.

Figure 15:
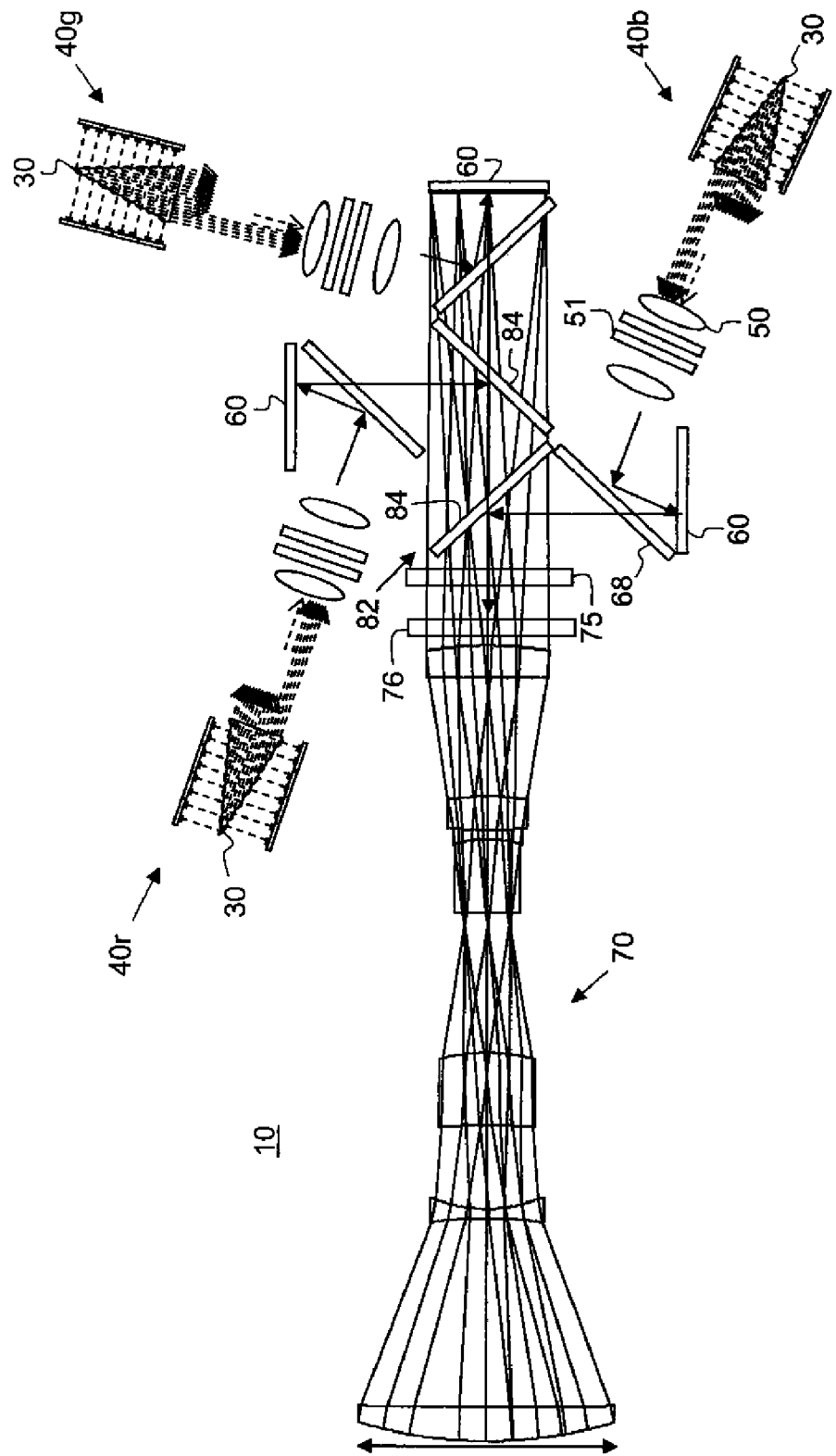
FIG. 15 is a schematic diagram of a stereo projection apparatus using the configuration of FIG. 14, in conjunction with a broadband electronic polarization rotation device.

FIG. 15 shows a stereoscopic embodiment where a broadband electronic polarization rotator 75 is used to successively switch between two output polarization states for left- and right-eye images. Polarization rotator 75 is located in the optical path following the beam combiner 82, which combines the modulated beams. Electronic polarization rotator 75 is considered broadband in that it must be able to rotate the polarization states equally over the visible spectrum created by the combined light sources. This location is advantaged because the projected beam size is relatively large. Therefore, the energy density on the electronic polarization rotator 75 is near its lowest for a combined beam. Optional quarter wave plate 76 may be placed either directly before or after polarization rotator 75, depending upon preference for polarization properties. In this case, it is desirable to have all of the laser light from all of the sources share the same polarization orientation. Half wave plates or color selective retarders may be used along the light path to correctly orient the polarization states. Additionally, a polarizer may be used to block or reflect any spurious polarization state prior to the electronic polarization rotator 75.

Liquid crystal variable retarders, as an example of electronic polarization rotators 75, are easier to fabricate with relatively uniform retardance verses wavelength when the input polarization state is circular. For this device type, then, it may be preferable to locate quarter wave plate 76 directly after the beam combiner 82 and before the electronic polarization rotator 75. Alternately, quarter wave plates may be placed in each of the primary color paths, however this requires multiple elements. Stereo imaging is thus created by timing the corresponding image content intended for each eye in synchronization with liquid crystal rotator 75. Additionally, a polarization maintaining display surface is used and viewer polarization glasses are provided, so that each eye receives light of only the intended orthogonal polarization states.

Figure 16:
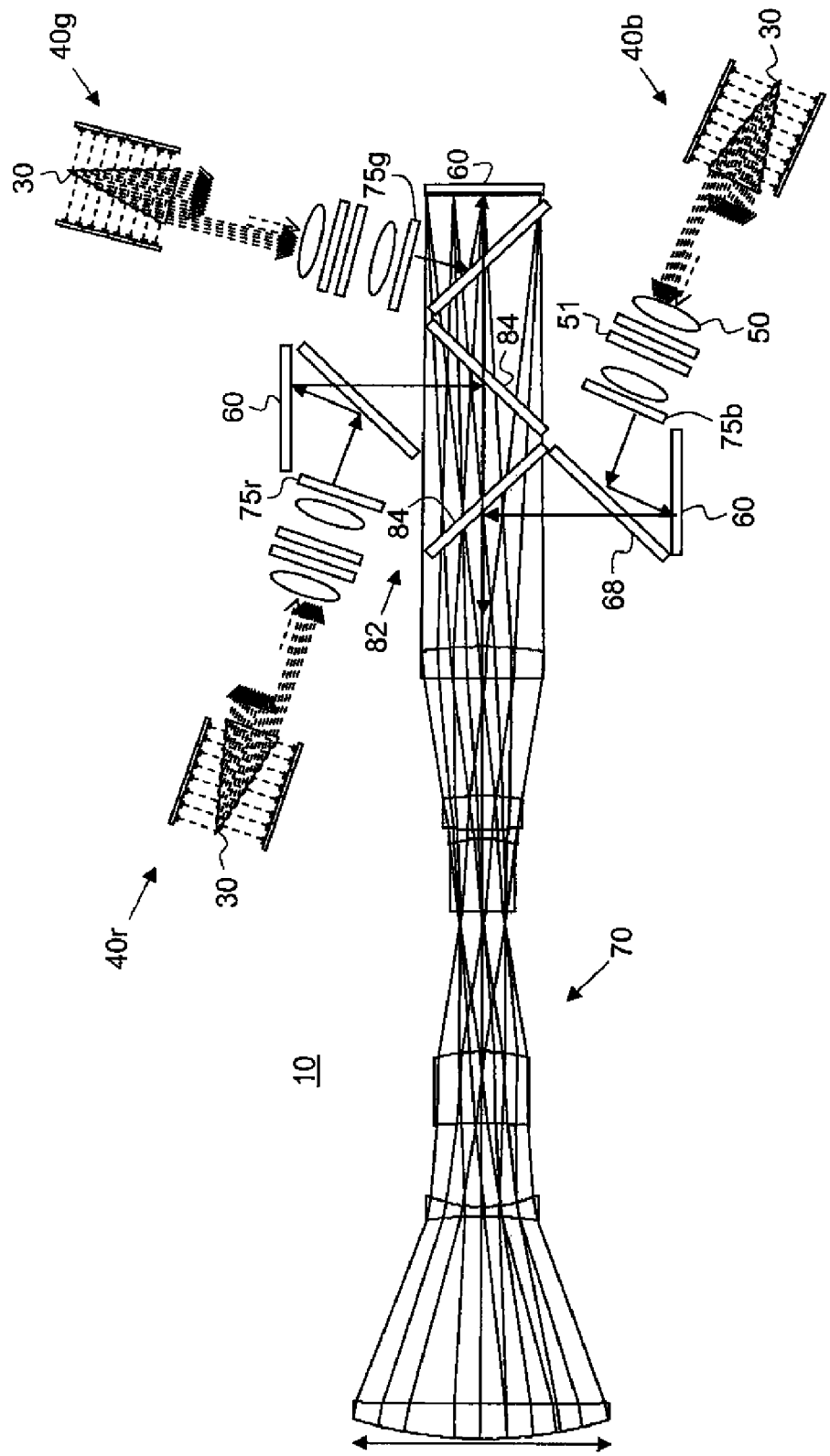
FIG. 16 is a schematic diagram of a stereo projection apparatus using the configuration of FIG. 14, in conjunction with individual color band electronic polarization rotation devices.

While the embodiment of FIG. 15 minimizes the energy density for a combined image, this energy density may still not be low enough to prevent damage to the polarization rotator. In many cases it is also simpler to create an electronic polarization rotator for a narrow band of light. An alternate embodiment, shown in FIG. 16, has a narrow band polarization rotation component 75r, 75g, 75b in each branch of the illumination sections 40r, 40g, 40b. In this case, the electronically controlled polarization rotator only needs to perform a substantially half wave rotation for the narrow spectrum of a single color band, on the order of 1 nm. In the case where the electronic polarization rotator is of a liquid crystal based electronic retarder, this greatly simplifies the structure and works well in linearly polarized light. Thus the cost and complexity of each of these rotators is reduced. Placing the polarization retarder after the integrator 51 eliminates potential higher energy density "hot spots" that might occur from more direct laser illumination. This balanced light/heat load improves the stability and performance of the device. Additionally, as only a single band is used and is maintained on the device without modulation, a more consistent and lower energy density can be delivered, compared with the embodiment described earlier and shown in FIG. 15. As before, an optional quarter wave plate retarder may be used either on each of the color bands, or as in FIG. 15, after the color combiner in the system. Similarly, a polarizer may be used prior to the electronic polarization rotator in order to provide the optimum polarization states.

Multiple laser combiners may be utilized such as in FIG. 14, where each combiner has a different orthogonal polarization state and adjacent wavelength spectrum associated with it. For example the illumination unit 40b may be comprised of a first combiner with a linear p-polarization state and a second combiner with a linear s-polarization state. The primary spectrum of the first combiner may be shifted from the second combiner by 15-25 nm. A polarization beam-splitter 62 may be used to combine the two sets of lasers together. Subsequently, a color selective polarization retarder may be used in the path after the polarization beam-splitter 62 to rotate only one of the two combiner spectral wavelengths by 90 degrees so as to align its polarization state with that of the adjacent spectrum from the alternate combiner. In this way, no etendue is gained in the system and electronic polarization rotator 75 from FIG. 15 may be utilized to rotate the single polarization state orthogonally to create light for imaging to each respective eye.

Figure 18:
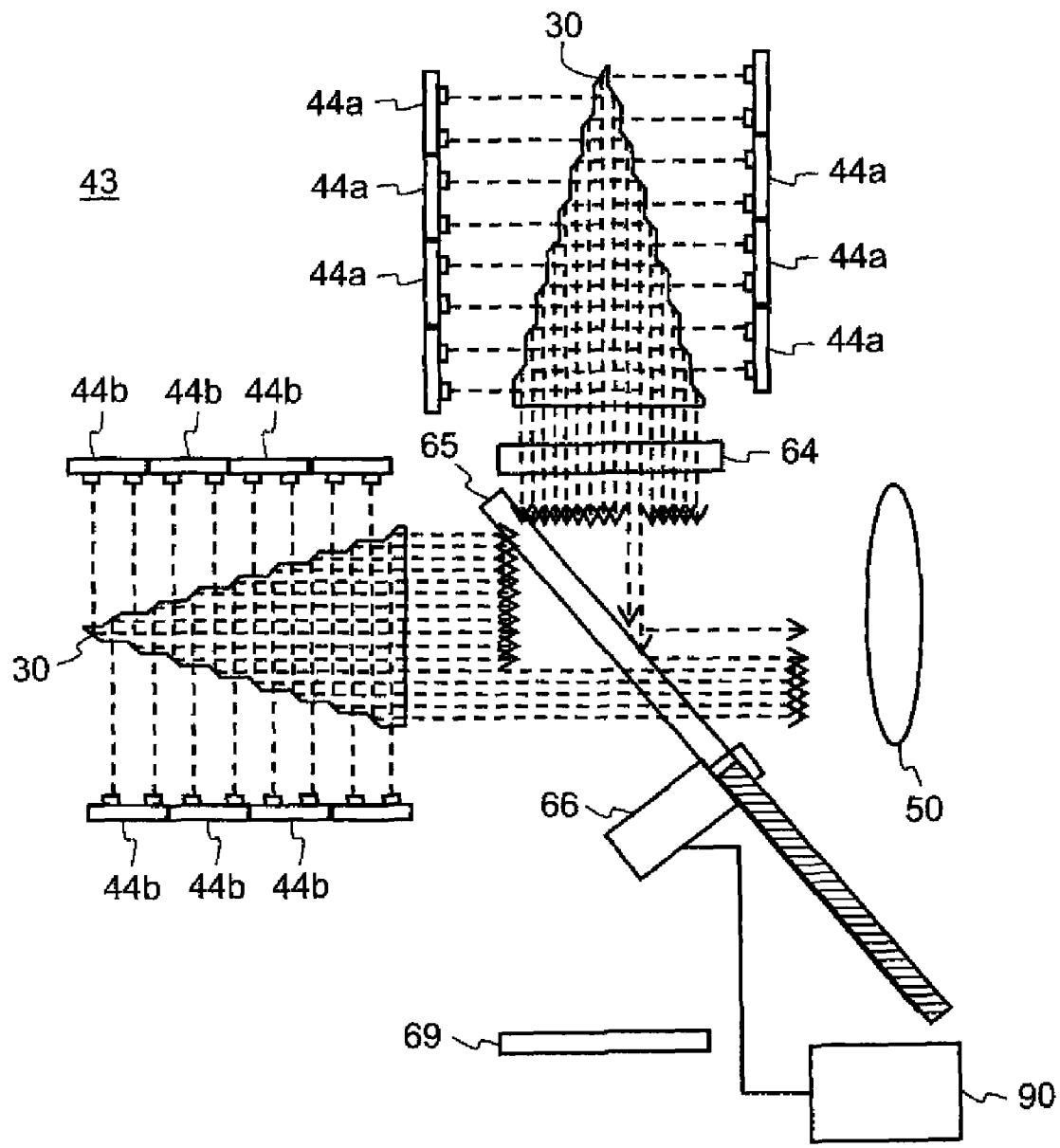
FIG. 18 is a schematic diagram of a shutter system alternately selecting light of each orthogonal polarization.

Another method for creating alternating orthogonal polarizations in order to generate a stereoscopic viewing experience is to mechanically shutter between the two orthogonal states as shown in FIG. 18. In an illumination combiner 43, lasers 44b are combined to generate a first linear polarization state, while lasers 44a, in conjunction with half wave plate 64, generate light of a second linear polarization state that is orthogonal to the first linear polarization state. (The two orthogonal polarization states can also be formed by simply rotating one of the sets of lasers such that the output polarizations are orthogonal.) A rotating shutter disk 65 is placed in the path of the optical axes for the first and second orthogonal polarization states and produces a merged optical axis. The rotational position of rotating shutter disk 65 is controlled by a control logic processor 90 that controls a motor 66.

Figure 19A:
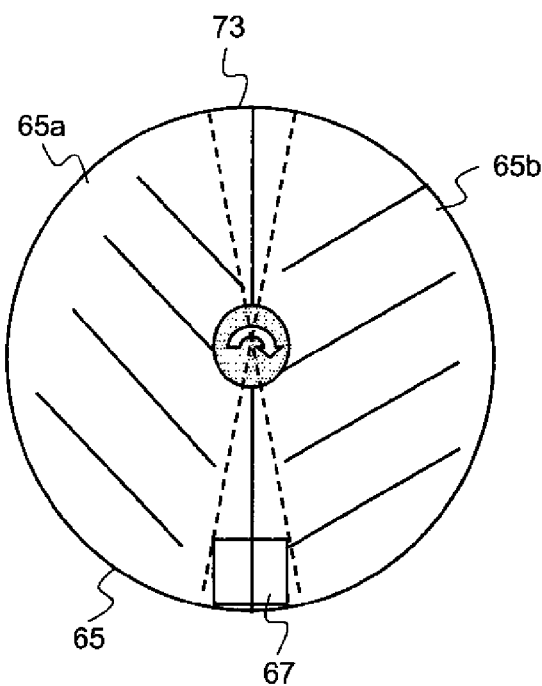
FIGS. 19A and 19B show front and side views, respectively, for a shutter that reflects light from one side and transmits light through the other.
Figure 19B:
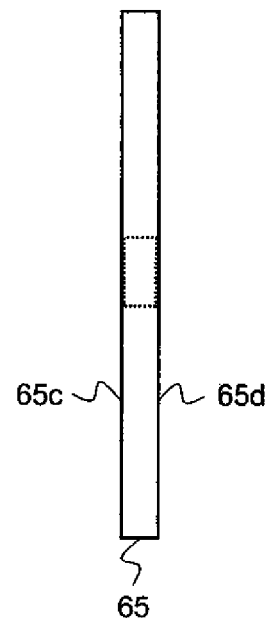

Rotating shutter disk 65, shown in plan and side views respectively in FIGS. 19A and 19B, preferably has a glass disk with a least two segments. A first transparent segment 65a is designed to substantially transmit all of the light that is incident upon it. A second reflective segment 65b is designed to substantially reflect all of the light that is incident upon it. When transparent segment 65a is positioned along the optical axis, light from lasers 44b is transmitted through to the downstream system components, while light from lasers 44a is absorbed by a beam dump 69. Alternately, when reflective segment 65b is positioned along the optical axis, light from lasers 44a is reflected through to the downstream system components, and light from lasers 44b is directed to beam dump 69. In this manner, light of alternating orthogonal polarizations is delivered to the spatial light modulators to create the stereoscopic images by rotating the shutter disk 65 in synchronization with the formation of the stereoscopic images on the spatial light modulator. It should be noted that there is a transition region 73 between polarization states where the light beams straddle the boundary between the transparent segment 65a and the reflective segment 65b, as noted in FIG. 19A. Here, illumination light 67 straddles the boundary between the transparent segment 65a and reflective segment 65b. In this case, polarization of both states is inadvertently delivered to the spatial light modulator. This condition causes crosstalk between the images of the two eyes, also known as ghosting, which can also reduce contrast. Some amount of crosstalk may be acceptable. However, if the crosstalk is excessive, the spatial light modulator may be turned to the off state during this transition period, eliminating the crosstalk at the cost of some lost light. Therefore, it is desirable to minimize this transition region. This can be achieved by either minimizing the spot size of the illumination light or by enlarging the shutter wheel, placing the illumination light as far toward the outer diameter as practical.

While the embodiment of FIG. 18 functions to alternate the polarization states of light directed to the spatial light modulator, over 50% of the light is lost to beam dump 69. This essentially reduces system efficiency to that of conventional approaches. Another embodiment, shown in FIG. 20, extends the function of shutter disk 65 to recover the light that was previously delivered to beam dump 69. In an illumination combiner 45, the light formerly in the beam dump path has its polarization state converted by a half wave plate 64'. This converts the light to the same polarization state that is directly delivered to the spatial light modulator by shutter disk 65. This polarization converted light is then directed by mirrors 71 to a path that is adjacent to the light coming directly from shutter disk 65. The combined light of both laser arrays, now of the same polarization state, is delivered to uniformizing optics and to the spatial light modulator. Again, by rotating shutter disk 65 using motor 66, light is alternately delivered in orthogonal polarization states.

Figure 20:
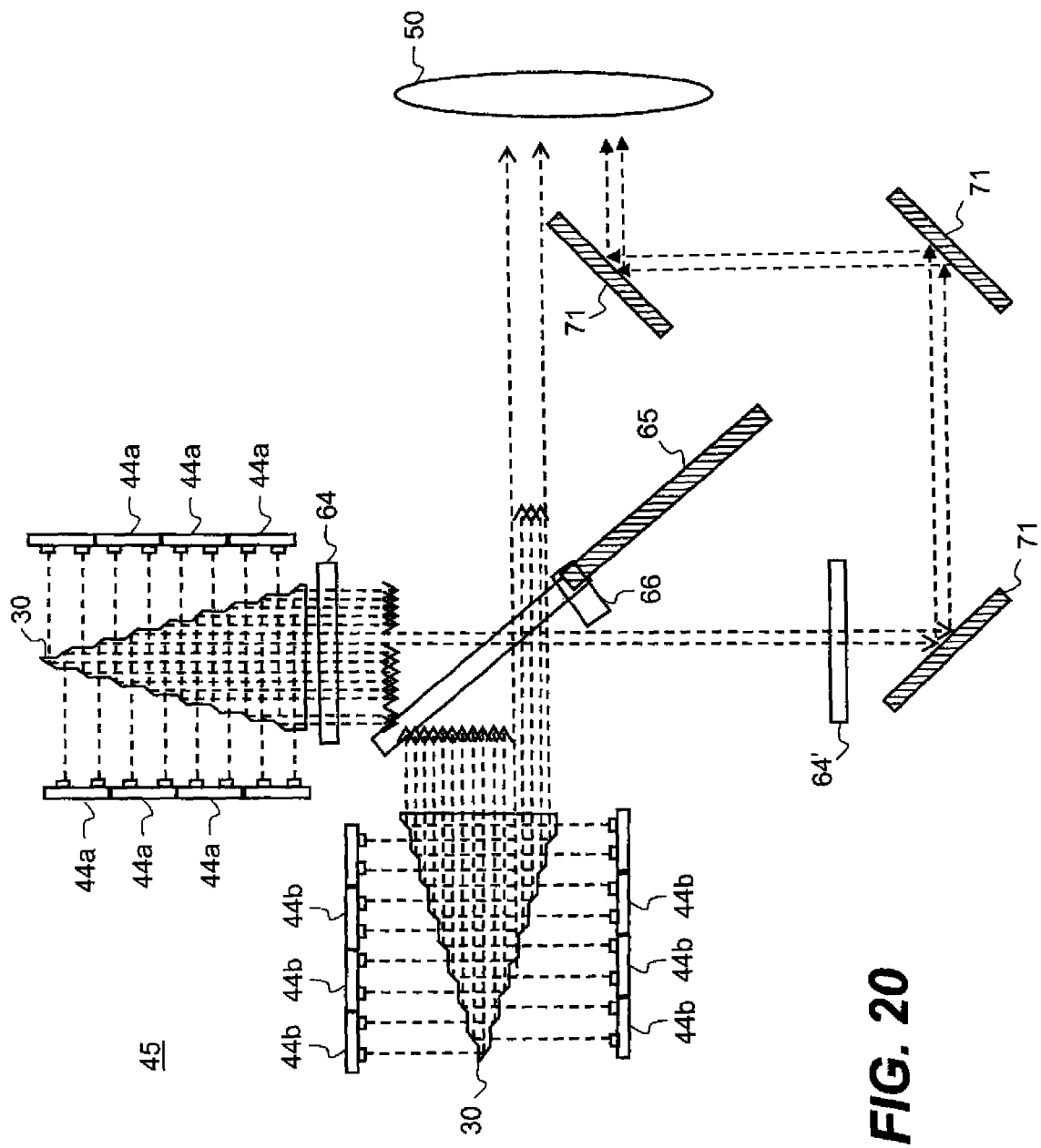
FIG. 20 is a schematic of an embodiment of a recycling illumination system that alternately converts light to two orthogonal polarization states.

For the embodiment of FIG. 20, it can be observed that the etendue of the light source has doubled compared with its state as delivered in FIG. 18. This etendue may be provided to the uniformizing optics with double the area, with the original and converted beams side by side and in the same angular space. Alternately, the light may be provided with some amount of overlap from each laser source. Angular overlapping may be more desirable because it would be easier to achieve a uniform illumination for all pixels by mixing in this space, as the projection lens is typically telecentric. While the optics following the illumination path needs to handle this large etendue in order to be efficient, this is not a very difficult problem due to the nature of the low starting etendue of laser sources.

Figure 21:
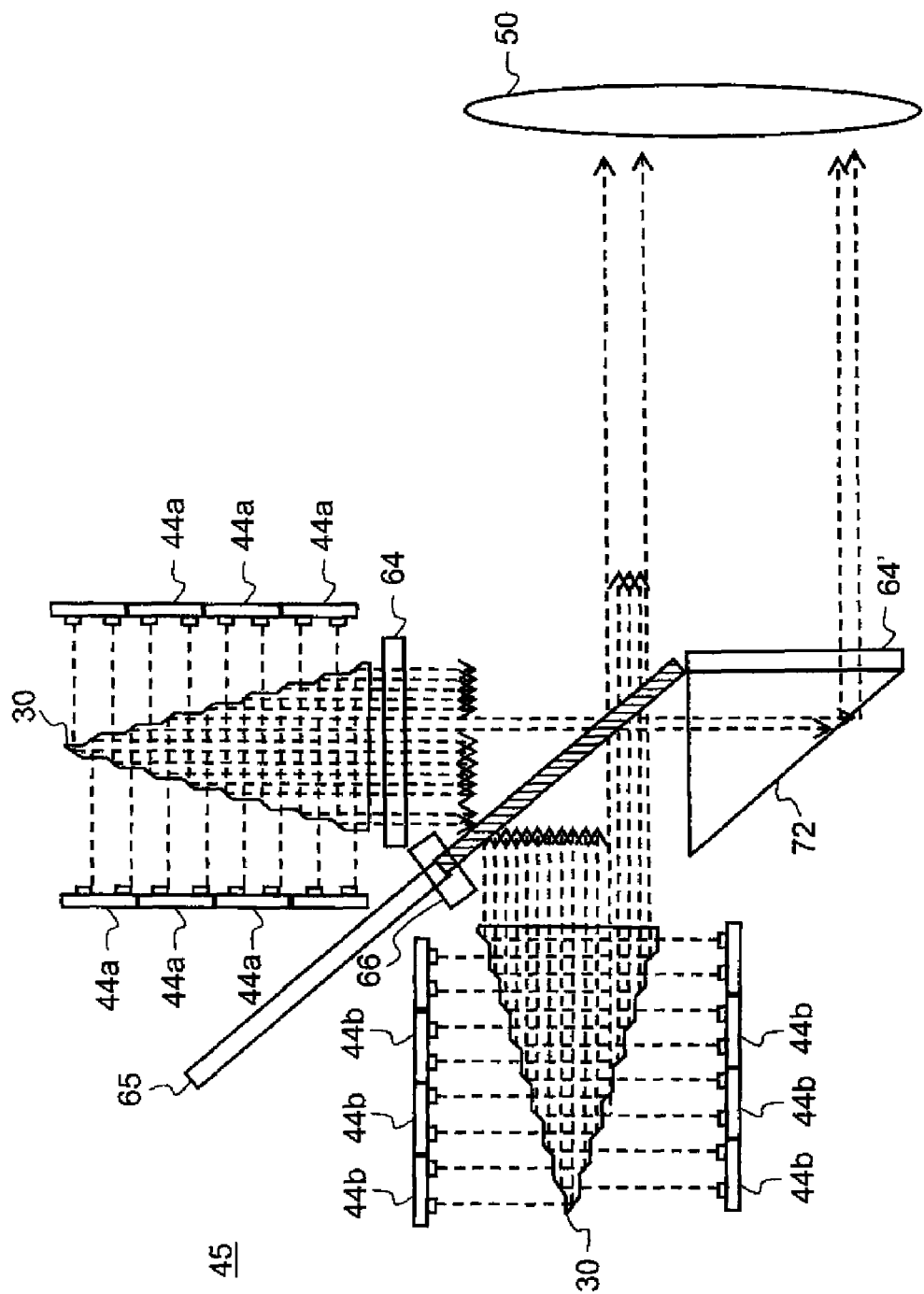
FIG. 21 is an alternate embodiment of the recycling illumination system shown in FIG. 20.
Figure 22:
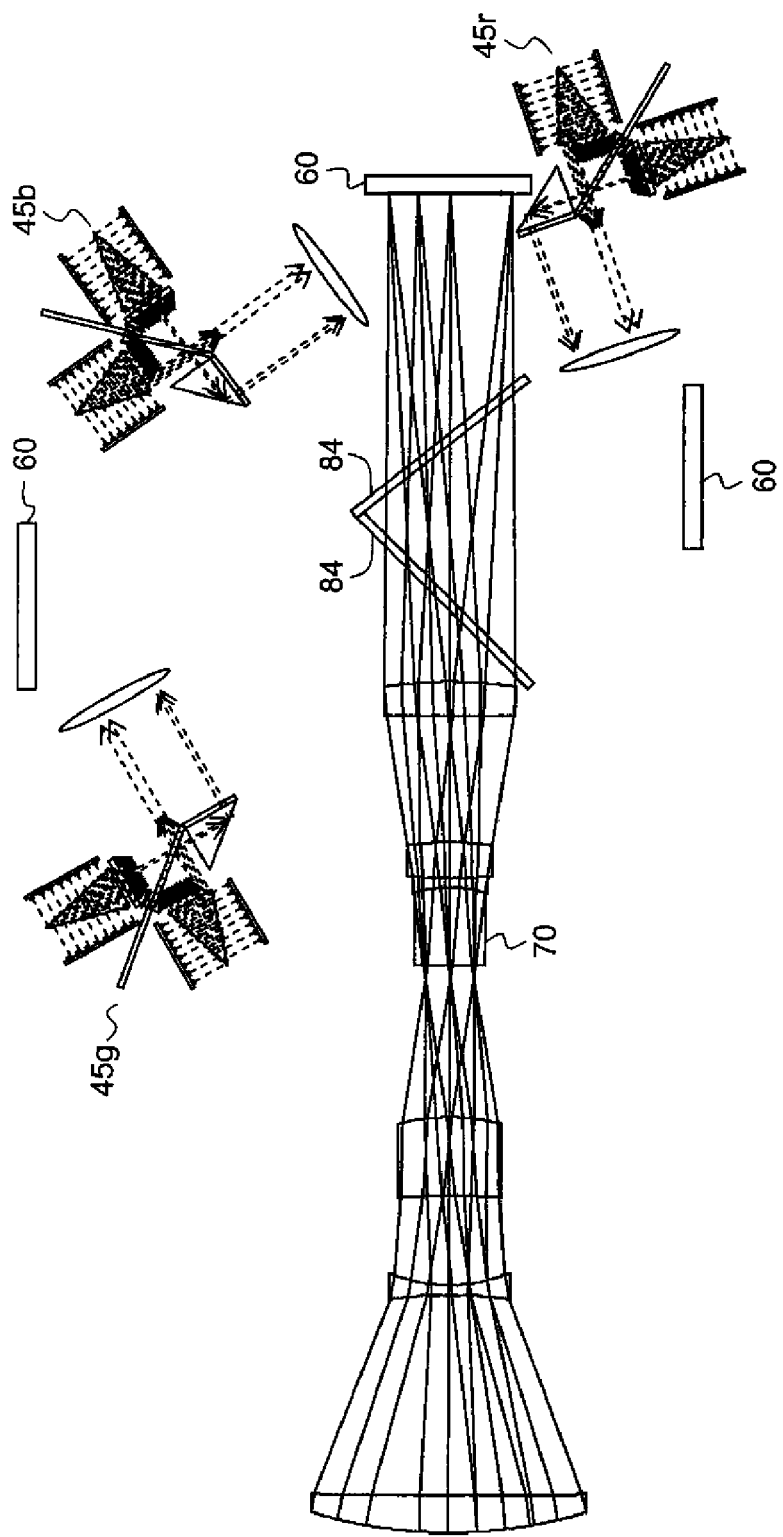
FIG. 22 is a schematic diagram of a stereo projection apparatus using alternating orthogonal polarization states provided by the illumination system described in FIG. 21.

FIG. 21 shows an alternate embodiment that also uses the recovered polarized light but requires fewer components. In this case, the light formerly captured by the beam dump 69 is instead redirected using reflective prism 72 and passes through half wave plate 64', which rotates the polarization. FIG. 22 shows a projection system incorporating three illumination combiners 45r, 45g and 45b, each of the type shown in FIG. 21. The illumination combiners 45r, 45g and 45b each produce alternating orthogonal polarization and directly illuminate corresponding spatial light modulators 60 for each color channel. The beams are subsequently combined with dichroic plates 84 and are projected by projection optics 70.

This same approach works appropriately for non-stereoscopic projection as well without additional light loss, even during the transition regions. Therefore, unlike conventional solutions, it is not necessary to remove the shutter wheel or polarization switch in order to improve the throughput efficiency in order to utilize the projection system for conventional non-stereoscopic imaging. In this case, motor 66 may be shut down to save on lifetime or power consumption when the projection system is used for conventional non-stereoscopic imaging, preferably with the transmissive region of the shutter in the optical path so that unnecessary coating damage and heat buildup can be minimized.

The rotating shutter mechanism of FIGS. 19A and 19B may serve an added function of speckle reduction in addition to providing the alternating orthogonal polarization feature. Speckle was discussed earlier as a potential issue for laser projection. While the use of multiple lasers tends to reduce the general coherence of the lasers to substantially reduce speckle, there can be residual coherence, especially in the case of small screens where fewer lasers are used. To reduce speckle artifacts, a coherence-breaking coating may be applied to one or both sides of the shutter. Additionally the use of uniformizing optics that mix the light, either spatially or angularly, in conjunction with variations in the optical path due to wavefront deviations in the shutter substrate, substantially reduces any remaining coherence and, therefore, speckle.

FIG. 19B shows a shutter disk 65 having one diffuse side 65c and one polished side 65d. The diffuse side 65c is fabricated with a ground surface, while the polished side 65d is fabricated with the polished surface. In a preferred embodiment of the present invention, the polished side 65d has an anti-reflection coating in one segment and a mirror coating in the alternate segment. The surface roughness of the diffuse side 65c should be high enough to eliminate visual speckle, but low enough to not substantially increase the angular extent of the source. The use of this relatively rough surface, in conjunction with the spatial motion provided by the rotating wheel, can reduce or eliminate any residual speckle artifacts from the system.

Alternately, as described earlier, both sides of the shutter disk 65 may be polished. However, in this case, the surfaces should not be optically flat, so that multiple waves of optical path difference are induced into the light beams as the shutter disk is rotated. This configuration has the advantage relative to the use of a diffuse surface in that it does not substantially increase the angular content of the illumination light, and therefore increase the etendue.

Figure 23:
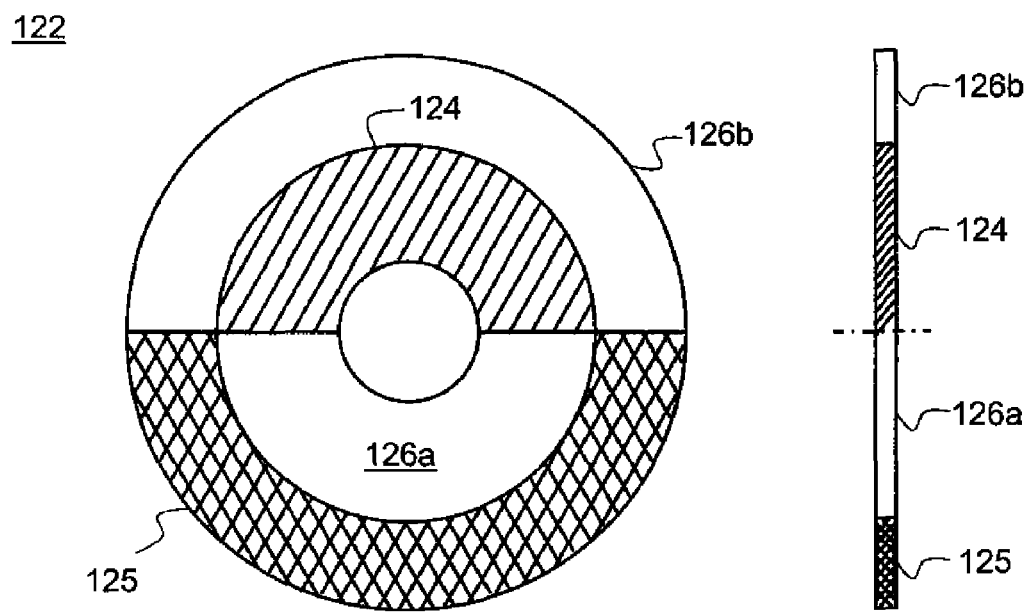
FIG. 23 shows a shutter disk having an alternating pattern of transmissive and non-transmissive segments.

Preferred embodiments of the present invention use a rotating element, such as a rotating segmented shutter disk, as part of a beam splitting apparatus for alternately generating separate first and second light beams from a single polarized light beam, so that one of the beams can subsequently have its polarization rotated to a different polarization state. Referring to FIG. 23, there is shown a plan and schematic side view of a segmented disk 122 that is configured as part of a beam splitting system that cooperates with a polarization rotator for providing alternating polarization states from a single light source. Segmented disk 122 has an arrangement with an inner reflective segment 124 and an outer non-transmissive segment 125 alternated with inner and outer transmissive segments 126a and 126b that provide a mechanism for this alternating light beam generation. Corresponding inner segments 124 and 126a are radially aligned with outer segments 126b and 125, so that outer non-transmissive segment 125 corresponds to and is peripheral to inner transmissive segment 126a. Similarly, outer transmissive segment 126b corresponds to and is peripheral to inner reflective segment 124. It should be observed that the embodiment of FIG. 23 has only two inner segments 124 and 126a and two outer segments 126b and 125. Embodiments that have more than two inner-outer segment pairs could alternately be used. Outer non-transmissive segment 125 can be reflective or, alternately, light-absorbing.

Figure 24:
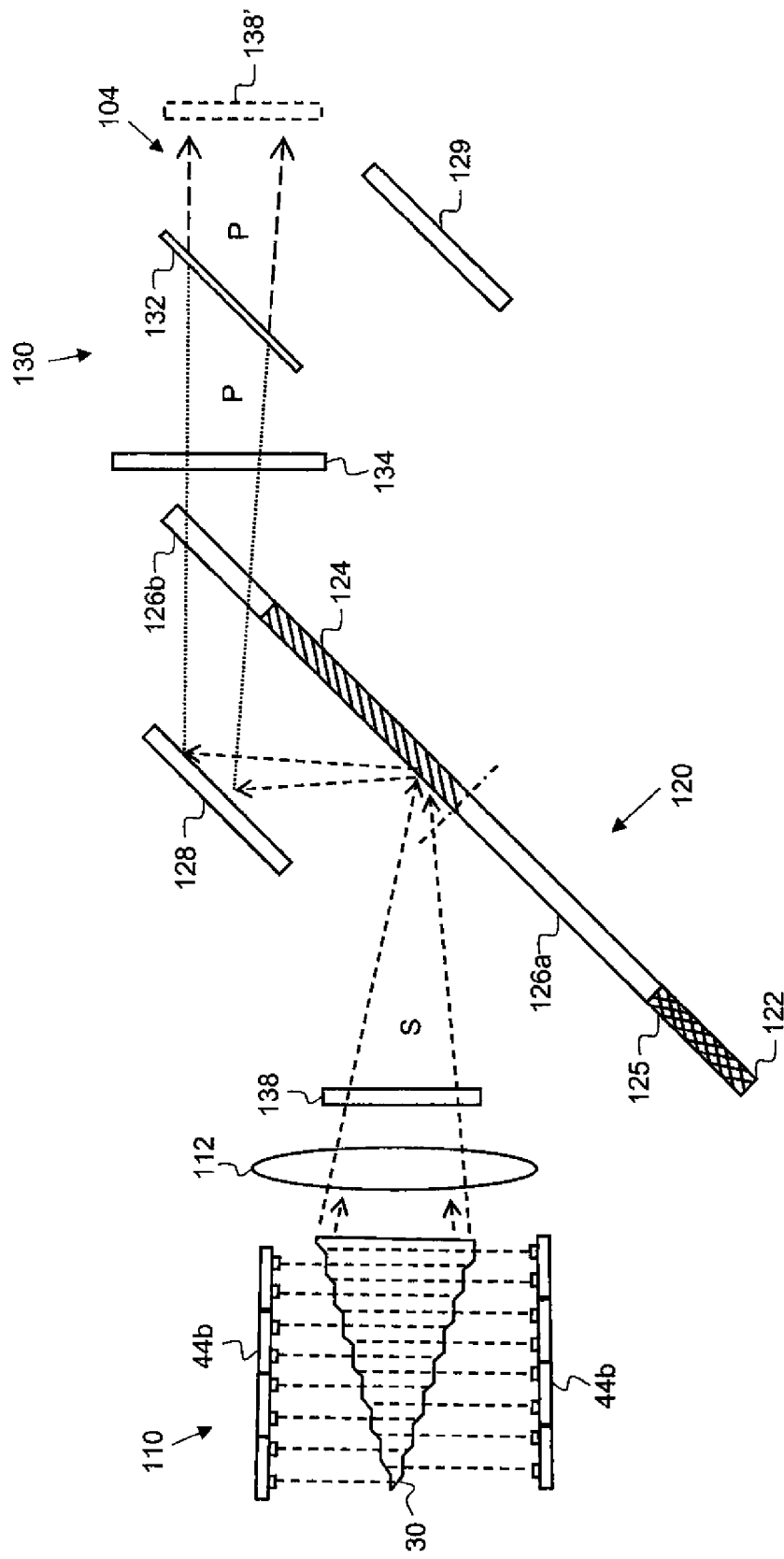
FIG. 24 is a schematic view showing light handling in the beam splitting system during one half-cycle.
Figure 25:
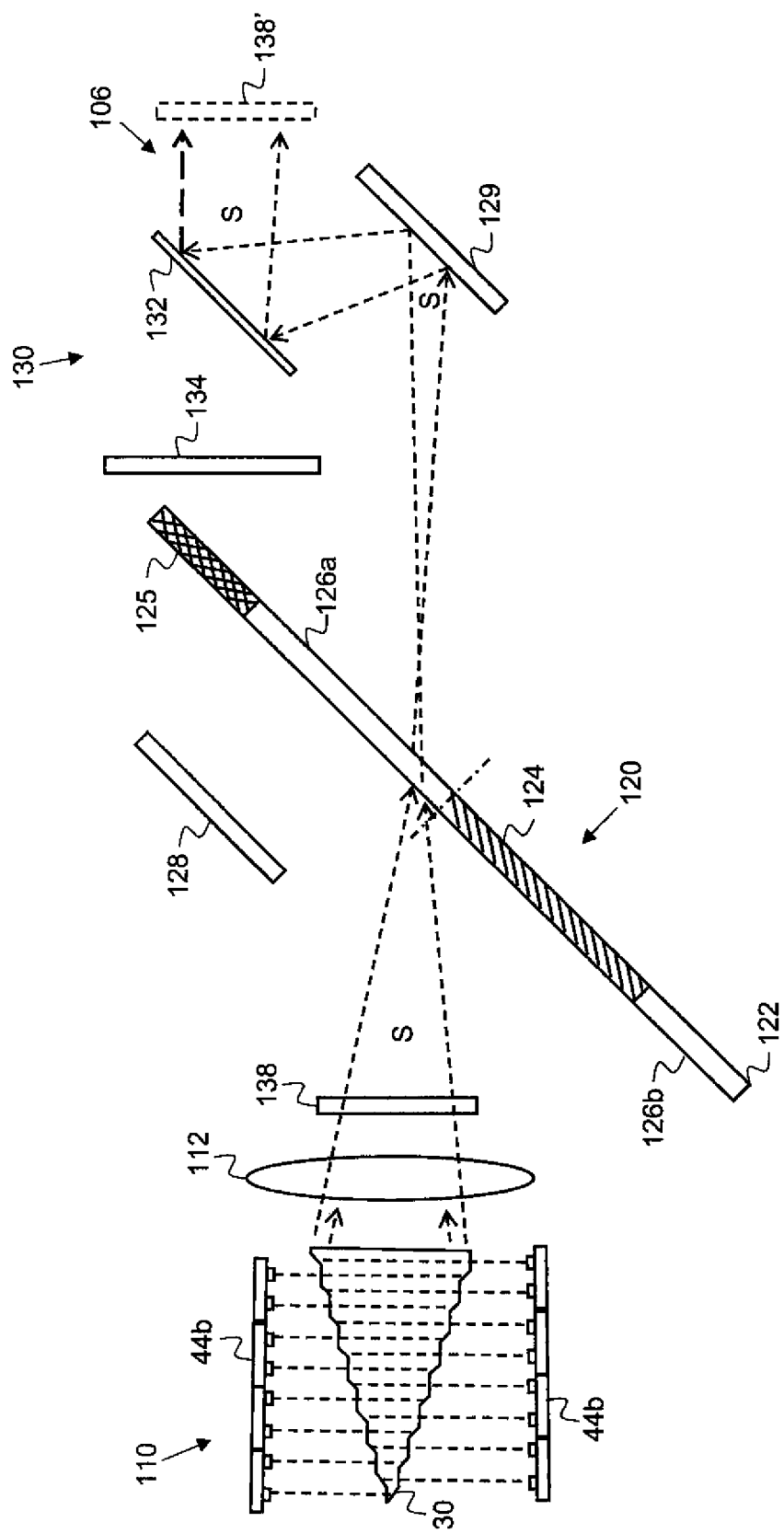
FIG. 25 is a schematic view showing light handling in the beam splitting system during the alternate half-cycle.

In order to better understand the role of segmented disk 122 for generating first and second light beams in an alternating manner, and to understand a number of improvements in alternative embodiments of the present invention, it is useful to consider how this device helps to provide illumination for stereoscopic image projection. Referring to FIGS. 24 and 25, a beam splitting system 120 accepts a polarized illumination from a light source system 110. Light source system 110 may use light-redirecting prism 30 and its support components, as described earlier, or some other source of polarized illumination. Beam splitting system 120 includes segmented disk 122. Unlike the shutter disk arrangements shown earlier that direct substantially collimated light to the spinning shutter disk, an optional converging optical element 112, such as a lens or a mirror, converges the polarized illumination to a reduced light beam diameter at segmented disk 122. A beam combining system 130 is configured to direct the respective light beams of different polarization states onto the same optical path. The beam combining system 130 includes an arrangement of supporting mirrors, reflective elements 128 and 129, a polarization rotator 134 and a polarization beam combiner 132. A motor or other actuator (not shown) provides the rotational motion that allows segmented disk 122 to provide separate beams. Polarization beam-splitters such as wire-grid, thin film plate or cube polarization beam splitters, or a Brewster angle beam combining element can alternately be used for reflective elements 128 and 129. Thin-film plates are generally lower cost solutions and can provide acceptable performance as reflective elements 128 and 129.

FIG. 24 shows the optical path during the half-cycle when the rotating segmented disk 122 is positioned such that the polarized illumination is reflected from the inner reflective segment 124 of segmented disk 122 and toward reflective element 128 that acts as a turning mirror. This light is transmitted through outer transmissive segment 126b and through a polarization rotator 134, such as a half-waveplate, reflective retarder, or electronic retarder that changes the polarization state of the illumination. In the example shown in FIG. 24, light from light source system 110 is S-polarized, whereas the light that emerges from polarization rotator 134 is orthogonal, or P-polarized. It can be appreciated that other arrangements are possible, including embodiments using other than a half wave plate, so that the respective polarization state of light from polarization rotator 134 is not necessarily orthogonal to the polarization state of the light emitted from light source system 110. In one embodiment, the orthogonal polarization state of light from polarization rotator 134 is an opposing circular polarization state. The functions of reflective element 128 and polarization rotator 134 are combined in another embodiment, by using a reflective retarder as reflective element 128.

Still referring to FIG. 24, a polarization beam combiner 132 in beam combining system 130 then transmits light of this polarization state to provide a first light beam 104 for modulation. Polarization beam combiner 132 can be a polarization beam splitter, such as a wire-grid, thin film plate or cube polarization beam splitter, or a Brewster angle beam combining element. Thin-film plates are generally lower cost solutions and can provide acceptable performance as polarization beam combiner 132.

FIG. 25 shows the optical path during the alternate half-cycle when the rotating segmented disk 122 is positioned such that the polarized illumination is transmitted through inner transmissive segment 126a of segmented disk 122 and toward reflective element 129. Reflective element 129 acts as a turning mirror and redirects the light, at its original polarization state, to polarization beam combiner 132. Polarization beam combiner 132 then reflects this light as a second light beam 106. The second light beam 106, will be in polarization state that is substantially orthogonal to the polarization state of the first light beam 104 (in this example, the second light beam 106 is S-polarized). In this way, both first light beam 104 and second light beam 106 are alternately directed along the same optical path as a combined light beam. Each beam 104 and 106 is provided during a separate time period so that the polarization state of the combined light beam alternates back and forth between the two substantially orthogonal polarization states.

Referring back to the plan view of segmented disk 122 in FIG. 23, it can be appreciated that there is some transition interval during the rotation of segmented disk 122 where one portion of the incident illumination beam is transmitted, and the other portion reflected at the same time. With respect to the overall cycle time of segmented disk 122, this "transitional" interval of the cycle time is unusable, since all of the illumination does not have the same polarization state during this interval. Therefore, there is an advantage in reducing the illumination beam width so that the beam diameter is small and has its minimum size at some point just after its incidence on segmented disk 122. Because segmented disk 122 receives converged light from light source system 110, the beam width that is incident on segmented disk 122 is significantly reduced, thereby reducing the time of the transitional interval, effectively increasing the amount of illumination that is available for modulation. The beam width of incident light on segmented disk 122 is the same for both transmitted and reflected light. In one embodiment using a generally collimated light, a first beam diameter of the first light beam when it passes through transmissive inner segment 126a is equal or substantially equal to a second beam diameter of the second light beam when it passes through the transmissive outer segment 126b. In yet another embodiment, the first and second light beams provided from beam splitting system 120 could be converged at a spatial light modulator or at a light integrator element in combining system 130, such as an integrating bar or lenslet array, or at some other component.

The angle and position of segmented disk 122 or other beam splitting device can be adjusted in order to produce a substantial match in light output intensity for the first light beam 104 and the second light beam 106 that are output from beam combining system 130. Alternately, angle, position, and optical parameters of segmented disk 122 or of polarization rotator 134 can be intentionally adjusted to correct for a condition elsewhere in the optical system, including positioning of a polarization beam combiner so that it provides less than the maximum polarization rotation.

Another advantage of beam splitting system 120 of the present invention relates to eliminating the need for separate light sources for each of two polarization states and the need to repeatedly cycle light sources on and off. Instead, embodiments of the present invention use the same light source system 110 for providing light for both polarization states. Further, the usage of alternating polarizations is commonly understood to provide some level of reduction of speckle from coherent light sources. (This is true even for the case where the digital projection system is not used for stereo projection, but where the images in a conventional video sequence are displayed using alternating polarizations according to the method of the present invention.)

Figure 26:
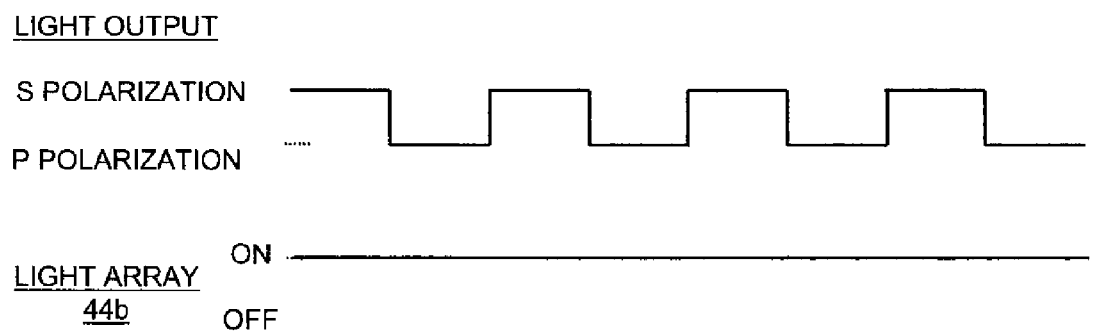
FIG. 26 is a timing diagram showing light output states using the beam splitting system.

Sensing and control logic, not shown or specifically described herein, but familiar to those skilled in the electronic image projection arts, would be provided in order to coordinate the relative timing of segmented disk 122 with the signal provided to the spatial light modulator within each of a number of color channels for a projector. The simplified timing chart of FIG. 26 shows that the light source, here solid state light arrays 44b, stays continually in the "on" position while alternately changing the polarization state of the light output. As noted earlier, the transition interval between polarization states, not represented in FIG. 26 timing, is reduced with the converged light path provided using converging optical element 112.

Figure 27:
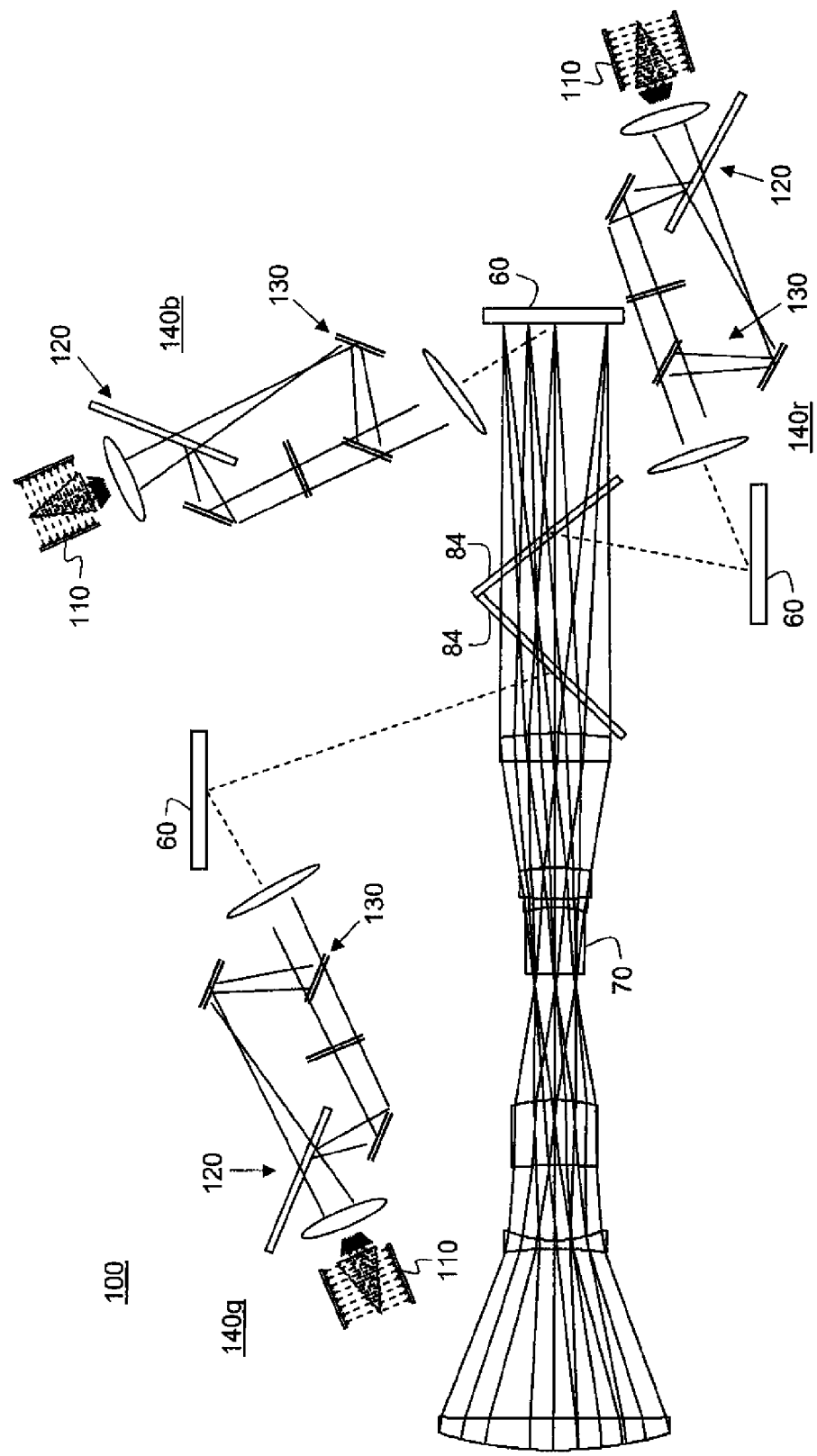
FIG. 27 is a schematic diagram showing a stereoscopic projecting system in one embodiment.

The schematic diagram of FIG. 27 shows an image projecting system 100 that uses the illumination apparatus of the present invention to provide illumination of alternating polarization states to spatial light modulators 60 in each color channel, shown herein as a red color channel 140r, a green color channel 140g, and a blue color channel 140b. Each color channel includes its own light source system 110, beam splitting system 120, and beam combining system 130. Within each color channel, spatial light modulator 60 modulates the combined light beam from its corresponding beam combining system 130 in a manner consistent with stereoscopic image data to form a first modulated image from illumination in the combined light beam having the first polarization state and to form a second modulated image from illumination in the combined light beam having the second polarization state. Image projecting system 100 also includes the needed components for combining light from each color channel (dichroic surfaces 84 in this example) and projection optics 70 for forming a stereoscopic image on a display surface.

One advantage of the beam splitting method described with reference to FIGS. 23-26 relates to the characteristics of the light for each polarization half-cycle. Because the same source light is used in light source system 110, spatial and angular characteristics of the combined light beam are substantially equivalent between the alternating polarization states. Aspects of thickness, angle of incidence, and refractive index of components in the optical paths of the first and second light beams can be configured to support the equivalence or substantial equivalence of the spatial and angular characteristics.

Figure 28B:
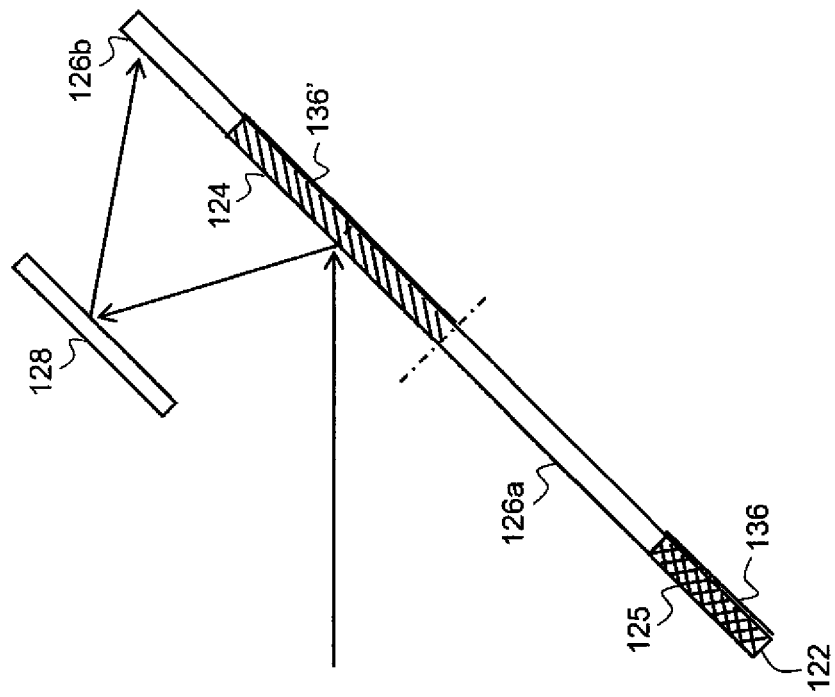
FIGS. 28A and 28B show embodiments of a segmented disk with light-absorbing elements for providing light of two polarization states.
Figure 28A:
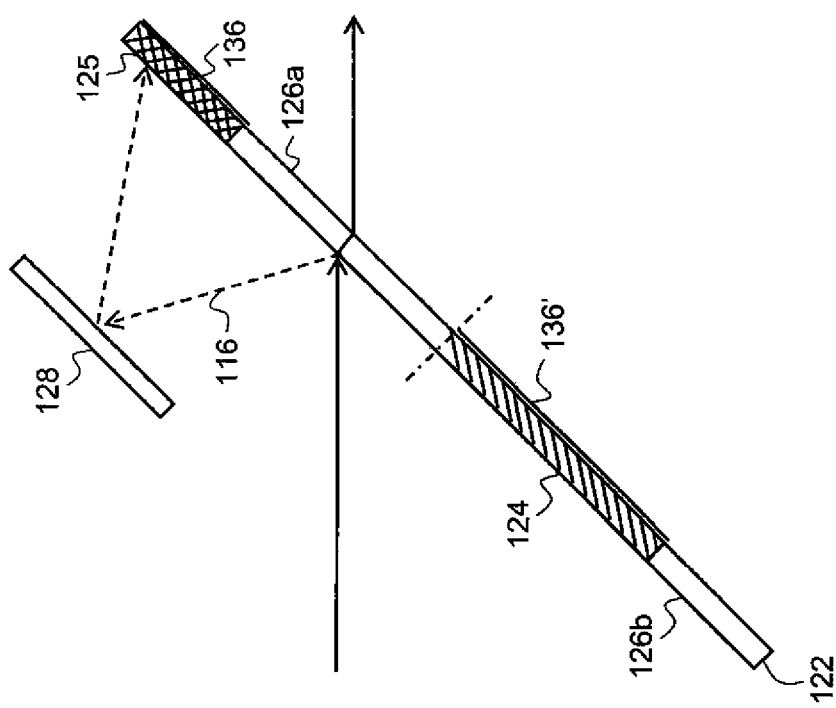

When using segmented disk 122, ghosting effects that cause crosstalk between the right- and left-eye images can occur due to stray light that is unintentionally reflected or transmitted. One method for reducing the likelihood of detectable ghosting effects is to fabricate segmented disk 122 to be as thin as is possible. Other methods include using various light-absorbent materials on the front or incident light surface or on the opposite rear surface of segmented disk 122. For example, non-transmissive segment 125 could be light-absorbing. The schematic side view of FIG. 28A shows a light absorbing element 136 applied to the rear surface of segmented disk 122, behind non-transmissive segment 125. Stray light 116 reflected from the front surface of transmissive segment 126a and not otherwise absorbed or reflected back by non-transmissive segment 125 is absorbed at light absorbing element 136. The schematic side view of FIG. 28B shows light absorbing element 136' applied to the rear surface of segmented disk 122 behind reflective segment 124, reducing the likelihood of stray light transmittal through reflective segment 124.

Either or both front and rear surfaces of segmented disk 122, or any of their segments, can be treated in various ways to affect light handling. For example, outer non-transmissive segment 125 may be reflective, absorbing, scattering, or some combination of these or other behaviors, such as both absorbing and scattering. Texturing can be provided over at least some portion of segmented disk 122, for reducing coherence artifacts or other problems.

An optional uniformizing element can also be included as part of the illumination system. FIGS. 24 and 25 show an optional uniformizing system 138 in one possible position in the path of the polarized light beam from light source system 110. FIGS. 24 and 25 also show an optional uniformizing system 138' in an alternate position in the path of the combined light beam. Any of a number of types of uniformizing element can be used, such as an integrating bar or a lenslet array, for example. As noted earlier, light convergence onto uniformizing system 138' can be provided using converging optical element 112.

Figure 29:
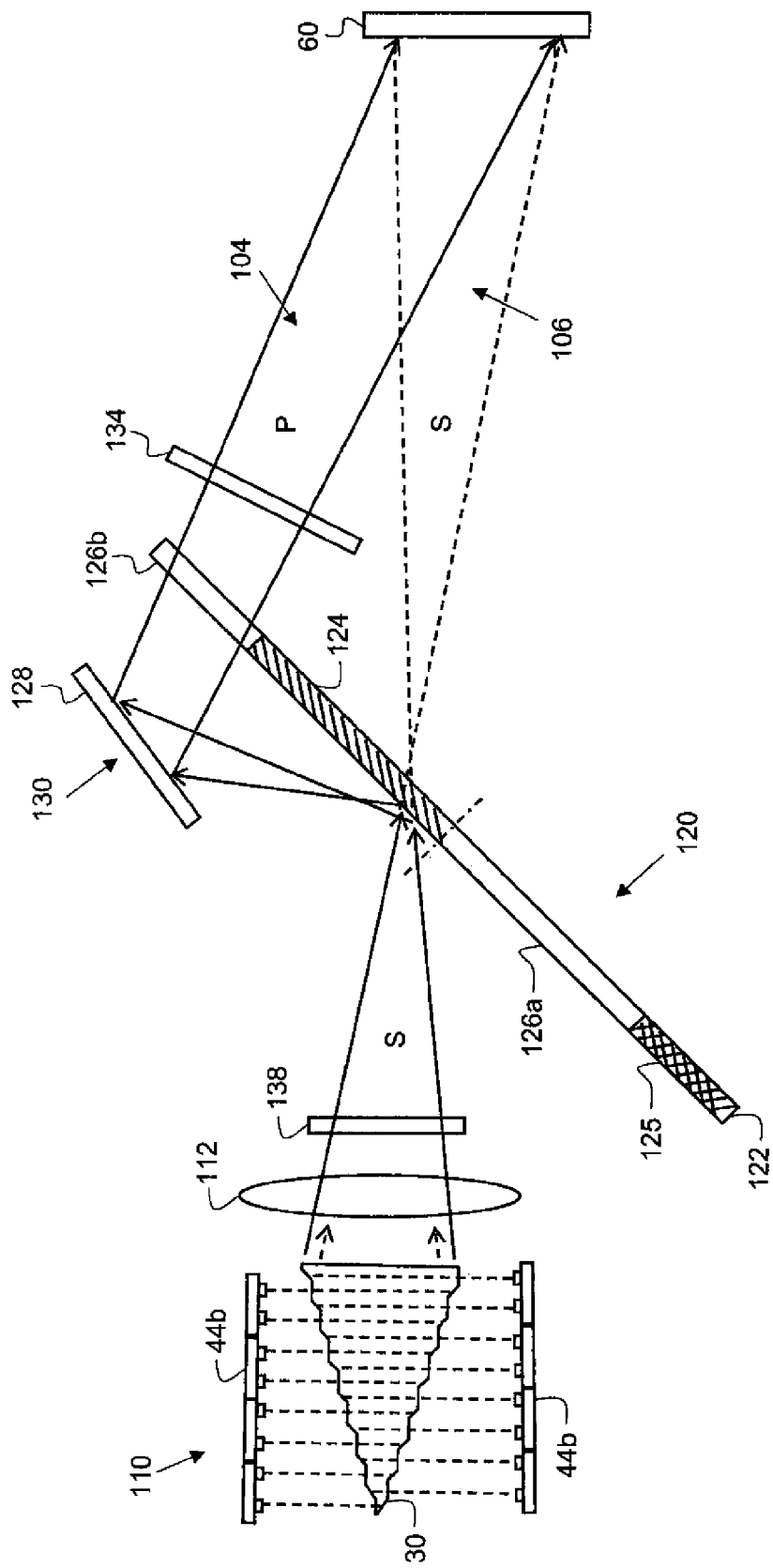
FIG. 29 shows an alternate embodiment of the present invention where a reflective element performs the function of the beam combining system.

An alternate embodiment of the present invention is shown in FIG. 29. In this case, the polarization beam combiner is eliminated and reflective element 128 is arranged to perform the function of the beam combining system 130. In FIG. 29, the segmented disk 122 is positioned such that the light beam from the light source system is reflected from inner reflective segment 124, reflected from reflective element 128, transmitted through outer transmissive segment 126b and then passes through polarization rotator 134 to form the first light beam 104. When the segmented disk 122 is rotated, the light beam from the light source system is alternately transmitted through inner transmissive segment 126a to form the second light beam 106. Reflective element 128 is angled appropriately to converge the first light beam 104 and the second light beam 106 onto spatial light modulator 60. This arrangement decreases the number of optical components required, although it has the tradeoff that it increases the etendue of the light incident on the spatial light modulator. Alternately, the first and second light beams can be converged onto a uniformizing system such as an integrating bar or a lenslet array. In this case, the uniformizing system can be considered to be a component of the beam combining system.

Figure 17:
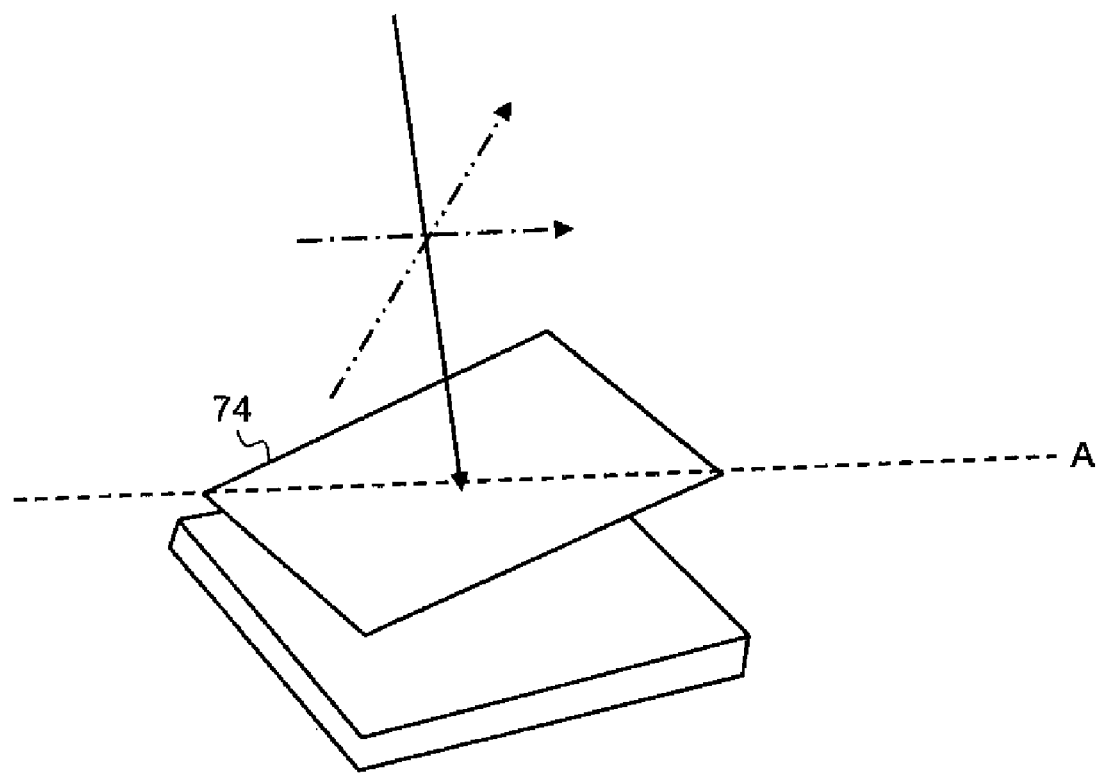
FIG. 17 is a perspective showing a single pixel modulator and its axis of rotation.

Most Micro-Electromechanical Structures (MEMS) such as DLP devices use a metallic reflector, typically formed from aluminum. Metal mirrors create very small phase shifts upon reflection when handling light from a skew angle. The preferred polarization orientation, where the DLP device maintains the polarization state after reflection, has the polarization axis either in line with or orthogonal to the hinge pivot tilt of micro-mirror 74, as shown in FIG. 17. Axis A indicates the hinge pivot line for a DLP micromirror. Polarization states oriented along other axes with regard to the plane of the micro-mirror can be used with minimal effect to the residual polarization, however.

Preferably, a modification to the conventional DLP package is used for the cover plate hermetic package. The conventional package is designed to provide an environmental seal as well as a defect-free surface to prevent scattering from impacting image quality. As such, the process of laser welding and thermally fusing windows into mechanical frames induces significant and inconsistent birefringence into each package. Variations in retardance of over 3 nm have been observed across sample devices. This would negatively impact the maintenance of the polarization state out of the device. Therefore new window packaging would be useful in order to properly utilize DLP devices with polarized light. Packages can be improved by utilizing a glass that has a low coefficient stress or thermally induced birefringence, such as SF57. An alternate approach would be to provide stress free mounting of a window to the window frame, for example using RTV to bond the window in place. Further isolation would be desired such that the mechanics of the window frame are rigid with respect to the window, but flexible with respect to the bonding surfaces to the chip frame. Likewise, this approach can be reversed. Further, it would benefit the procedure for bonding the window to the frame and the frame to the chip mounting if performed at the carefully controlled chip operational temperatures, so as to avoid stresses from an operational and packaging temperature difference.

The use of polarized laser light sources offers significant advantages for the projection of stereoscopic imagery. The efficiency gains over the conventional illumination sources discussed earlier allow the projector to more easily deliver images with brightness that is comparable with that of conventional 2D projection.

The invention has been described in detail with particular reference to certain preferred embodiments thereof, but it will be understood that variations and modifications can be effected within the spirit and scope of the invention. For example, where laser arrays are described in the detailed embodiments, other solid-state emissive components can be used as an alternative. Supporting lenses and other optical components may also be added to each optical path. In optical assemblies shown herein, the order of the uniformization or light integration and relaying can be reversed without significant difference in effect.

Thus, what is provided is an apparatus and method using polarized illumination for stereoscopic digital cinema projection having enhanced brightness and improved contrast.

PARTS LIST

10. Projector apparatus
12. Light source
14. Prism assembly
16. Position
18. Optics
20, 20r, 20g, 20b. Spatial light modulator
26. Laser
28. Incidence facet
29. Projection lens
30. Light redirecting prism
32. Incident face
34. Output face
36. Redirection surface
38. Light-redirecting facet
40r, 40g, 40b. Light modulation assembly
42. Illumination combiner
43. Illumination combiner
44, 44'. Solid-state light array
44a, 44b. Solid state laser array
45, 45r, 45g, 45b. Illumination combiner
46. Mirror
50. Lens
51. Integrator
52. Light guide
54. Lens
60. Spatial light modulator
62. Polarization beam-splitter
64, 64'. Half wave plate
65. Shutter Disk
65a. Transparent Segment
65b. Reflective Segment
65c. Diffuse Side
65d. Polished Side
66. Motor
67. Illumination light
68. Dichroic surface
69. Beam dump
70. Projection optics
71. Mirror
72. Reflective prism
73. Transition region
74. Micro-mirror
75. Electronic polarization rotator
75r, 75g, 75b. Narrow band polarization rotation component
76. Quarter wave plate
80. Display surface
82. Dichroic combiner
84. Dichroic surface
90. Control logic processor
100. Image projecting system
104. First light beam
106. Second light beam
110. Light source system
112. Converging optical element
116. Stray light
120. Beam splitting system
122. Segmented disk
124. Reflective segment
125. Non-transmissive segment
126a, 126b. Transmissive segment
128, 129. Reflective element
130. Beam combining system
132. Polarization beam combiner
134. Polarization rotator
136, 136'. Light absorbing element
138, 138'. Uniformizing system
140r. Red color channel
140g. Green color channel
140b. Blue color channel
A. Axis
A1. Light source area
A2. Modulator area
D1, D1'. Emission direction
D2. Output direction
L. Length direction
θ1. Output angle
θ2. Acceptance angle
S, P. Polarization state

The invention claimed is:

1. A stereoscopic digital image projecting system comprising:
   a light source system energizable to provide polarized illumination having a first polarization state;
   a beam splitting system comprising a rotating segmented disk disposed in a path of the polarized illumination and alternately generating first and second light beams from the polarized illumination, the rotating segmented disk comprising outer segments alternately transmissive and non-transmissive and inner segments radially aligned with the outer segments and each alternately reflective and transmissive, wherein the inner reflective segments correspond with the outer transmissive segments;
   a polarization rotator positioned in a path of either the first or second light beam and rotating the first polarization state to a second polarization state orthogonal or substantially orthogonal to the first polarization state;
   a combining system combining the first and second light beams into a combined light beam;
   a spatial light modulator modulating the combined light beam in a manner consistent with stereoscopic image data to form a first modulated image from illumination in the combined light beam having the first polarization state and to form a second modulated image from illumination in the combined light beam having the second polarization state; and
   projection optics configured to project the first and second modulated images onto a display surface.

2. The system of claim 1, wherein the first light beam is generated when the polarized illumination is transmitted through a transmissive inner segment and the second light beam is generated when the polarized illumination is reflected from a reflective inner segment and transmitted through a transmissive outer segment.

3. The system of claim 2, further including a converging optical element that converges the polarized illumination to a reduced light beam diameter at the beam splitting system.

4. The system of claim 3, wherein the converging optical element is a lens or a mirror.

5. The system of claim 3, wherein the converging optical element converges the polarized illumination such that a minimum beam diameter for the second light beam occurs at a point following its reflection from the reflective inner segment and prior to its transmission through the transmissive outer segment.

6. The system of claim 5, wherein a first beam diameter of the first light beam when it passes through the transmissive inner segment is equal or substantially equal to a second beam diameter of the second light beam when it passes through the transmissive outer segment.

7. The system of claim 2, wherein the beam splitting system further comprises a mirror that directs light reflected from the inner reflective segments through the outer transmissive segments.

8. The system of claim 7, wherein the mirror is angled appropriately to converge the first light beam and the second light beam thereby functioning as a component of the combining system.

9. The system of claim 8, wherein the first light beam and the second light beam are converged at the modulator.

10. The system of claim 8, wherein the first light beam and the second light beam are converged onto an integrating bar or a lenslet array.

11. The system of claim 7, wherein the mirror is a reflective retarder that performs the function of the polarization rotator.

12. The system of claim 1, wherein the outer non-transmissive segments are light absorbing.

13. The system of claim 1, wherein the outer non-transmissive segments are reflective.

14. The system of claim 13, wherein a back surface of the outer reflective segments is light absorbing, scattering, or both absorbing and scattering.

15. The system of claim 1, wherein the rotating segmented disk comprises only two outer segments and two inner segments.

16. The system of claim 1, wherein at least a portion of the rotating segmented disk is textured in a manner that reduces coherence artifacts.

17. The system of claim 1, wherein the combining system comprises a polarizing beam splitter, an integrating bar, or a lenslet array.

18. The system of claim 1, wherein the polarization rotator comprises a half-wave plate or a reflective retarder or an electronic retarder.

19. The system of claim 1, wherein the combining system comprises a polarization beam combiner.

20. The system of claim 19, wherein the polarization beam combiner is a thin film plate, thin film cube, wire grid, or Brewster angle element.

* * * * *